(12) United States Patent
Gebhard et al.

(10) Patent No.: US 7,265,166 B2
(45) Date of Patent: Sep. 4, 2007

(54) AQUEOUS POLYMER COMPOSITION

(75) Inventors: Matthew Stewart Gebhard, New Britain, PA (US); Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 510 days.

(21) Appl. No.: 10/884,586

(22) Filed: Jul. 2, 2004

(65) Prior Publication Data

US 2005/0009954 A1 Jan. 13, 2005

Related U.S. Application Data

(60) Provisional application No. 60/485,411, filed on Jul. 8, 2003.

(51) Int. Cl.
*C08K 9/00* (2006.01)

(52) U.S. Cl. .................. 523/205; 523/206; 523/210; 524/504; 524/505; 524/804

(58) Field of Classification Search ............... 523/205, 523/210, 206; 524/504, 505, 804
See application file for complete search history.

(56) References Cited

U.S. PATENT DOCUMENTS

| | | | |
|---|---|---|---|
| 4,158,736 A | 6/1979 | Lewis et al. | |
| 4,427,835 A | 1/1984 | Bush et al. | |
| 4,468,498 A | 8/1984 | Kowalski et al. | |
| 4,469,825 A | 9/1984 | Kowalski et al. | |
| 4,581,429 A | 4/1986 | Solomon et al. | |
| 4,594,363 A | 6/1986 | Blankenship et al. | |
| 4,880,842 A | 11/1989 | Kowalski et al. | |
| 4,920,160 A | 4/1990 | Chip et al. | |
| 4,985,064 A | 1/1991 | Redlich et al. | |
| 5,036,109 A | 7/1991 | Chip et al. | |
| 5,041,464 A | 8/1991 | Hoshino et al. | |
| 5,157,084 A | 10/1992 | Lee et al. | |
| 5,308,890 A | 5/1994 | Snyder | |
| 5,322,912 A | 6/1994 | Georges et al. | |
| 5,324,879 A | 6/1994 | Hawthorne | |
| 5,362,826 A | 11/1994 | Berge et al. | |
| 5,385,960 A | 1/1995 | Emmons et al. | |
| 5,409,776 A | 4/1995 | Someya et al. | |
| 5,412,047 A | 5/1995 | Georges et al. | |
| 5,510,422 A | 4/1996 | Blankenship et al. | |
| 5,710,227 A | 1/1998 | Freeman et al. | |
| 6,214,467 B1 | 4/2001 | Edwards et al. | |
| 6,258,887 B1 | 7/2001 | Bardman et al. | |
| 6,348,636 B1 | 2/2002 | Racz | |
| 6,492,451 B1 | 12/2002 | Dersch | |

FOREIGN PATENT DOCUMENTS

| | | |
|---|---|---|
| DE | 19651307 A1 | 6/1997 |
| DE | 19727502 A1 | 7/1997 |
| EP | 0 221 498 A | 5/1987 |
| EP | 0 458 245 A | 11/1991 |
| EP | 135 280 B1 | 5/1993 |
| EP | 1 138 730 A | 10/2001 |
| EP | 1 209 191 A | 5/2002 |
| EP | 1 273 636 A2 | 1/2003 |
| GB | 2 109 389 A | 6/1983 |
| WO | WO 93/11181 A | 6/1993 |

*Primary Examiner*—Edward J. Cain

(57) ABSTRACT

An aqueous polymer composition is provided containing select levels of hard polymer and soft polymer, wherein the hard polymer and the soft polymer are contained as dispersed particles. Portions of the hard polymer and optionally, the soft polymer, have select chemical groups. The aqueous polymer composition also contains composite particles formed from pigment particles and a plurality of polymer particles having the select chemical groups. The aqueous polymer composition is useful for preparing coatings having a combination of improved hiding, low temperature film formation, and hardness properties, such as dirt pickup resistance. Methods to prepare and to use the aqueous polymer composition are also provided.

6 Claims, No Drawings

AQUEOUS POLYMER COMPOSITION

CROSS REFERENCE TO RELATED PATENT APPLICATIONS

This is a non-provisional application of prior now abandoned U.S. provisional application Ser. No. 60/485,411 filed Jul. 8, 2003.

This invention relates to an aqueous polymer composition suitable for providing dry coatings having an improved balance of properties, such as hiding, dirt pickup resistance, and low temperature film formation. More particularly, this invention relates to an aqueous polymer composition containing composite particles formed from pigment particles and first polymer particles, and optional second polymer particles, wherein the amount of total hard polymer and total soft polymer in the aqueous polymer composition is within certain ranges.

Water based paints containing dispersed polymer particles are commonly used in the preparation of dried films, such as decorative or protective coatings. In the formulation of water based paints, the polymer particles and the other components of the water based paints are chosen to provide good film formation properties as well as to provide coatings having a balance of desired properties. Examples of desired coating properties include good hiding of the underlying surface; hardness properties such as block resistance, print resistance, dirt pickup resistance, and mar resistance; softness properties such as flexibility; adhesion to an underlying surface; as well as resistance to solvent and water. The balance of desired properties is often determined by the intended use of the dried coating, such as an interior or exterior coating.

Increasing the glass transition temperature of the polymer particles contained in the water based paint generally results in an increase in one or more of the hardness properties of the resulting coating. Decreasing the glass transition temperature of the polymer particles contained in the water based paint generally results in an increase in one or more of the softness properties of the resulting coating. Further, the use of film formation aides, such as coalescents, can be reduced or eliminated by decreasing the glass transition temperature of the polymer particles contained in the water based paint. Common coalescents are volatile organic substances, which evaporate into the atmosphere, and contribute to the formation of tropospheric ozone and photochemical smog.

Desired are water based paints that provide coatings having a balance of good hiding, acceptable hardness properties, such as dirt pickup resistance, and have good film formation, particular in the presence of low level of volatile coalescents or in the absence of volatile coalescents.

U.S. Pat. No. 6,214,467 B1 discloses coating compositions containing polymer-pigment composites, wherein the polymer is prepared by the polymerization of terminally-unsaturated oligomer containing acid functionality. The reference discloses that coatings containing the disclosed polymer-pigment composites have increased opacity.

Despite this disclosure, aqueous coating compositions are desired that provide a balance of good hiding, low temperature film formation, and acceptable dirt pickup resistance. Further, it is desired that these aqueous coating compositions may be formulated either with low levels of volatile organic compounds, such as volatile coalescents, or without volatile organic compounds.

The inventors have found an aqueous polymer composition that provides coatings with a combination of good hiding, low temperature film formation, and acceptable dirt pickup resistance. The aqueous polymer composition contains select levels of hard polymer and soft polymer, wherein portions of the hard polymer and optionally, the soft polymer, are attached to pigment particles by select chemical groups. Further, the aqueous polymer composition of this invention has good low temperature film formation properties, and may be provided as a composition with low levels of volatile organic compounds or absent volatile organic compounds.

According to the first aspect of the present invention, an aqueous polymer composition is provided, including:

a) first polymer particles containing at least one pendant group selected from phosphorus acid groups, phosphorus acid full-ester groups, polyacid sidechain groups, or mixtures thereof; wherein the first polymer particles contain, based on weight of the first polymer particles: from 40 to 100 weight % first hard polymer particles having a glass transition temperature of at least 20° C., from 0 to 60 weight % first soft polymer particles having a glass transition temperature in the range of from −20° C. to 5° C.; and from 0 to 60 weight % first hard-soft polymer particles including a first soft polymer phase having a glass transition temperature in the range of from −20° C. to 5° C., and first hard polymer phase having a glass transition temperature of at least 20° C.;

b) optionally, second polymer particles containing: second soft polymer particles having a glass transition temperature in the range of from −20° C. to 5° C., second hard polymer particles having a glass transition temperature of at least 20° C.; or second hard-soft polymer particles including second soft polymer phase having a glass transition temperature in the range of from −20° C. to 5° C., and second hard polymer phase having a glass transition temperature of at least 20 ° C.; and c) composite particles, wherein each of the composite particles includes a pigment particle and a plurality of the first polymer particles attached to the pigment particle;

wherein the aqueous polymer composition contains, based on total weight of the first polymer particles and the second polymer particles: a total weight % of the first soft polymer particles, the first soft polymer phase, the second soft polymer particles, and the second soft polymer phase in the range of from 60 to 98 weight %, and a total weight % of the first hard polymer particles, the first hard polymer phase, the second hard polymer particles, and the second hard polymer phase in the range of from 2 to 40 weight %.

A second aspect of the present invention provides an aqueous polymer composition including:

a) first polymer particles containing reacted complementary functional groups; wherein the first polymer particles contain, based on weight of the first polymer particles: from 40 to 100 weight % first hard polymer particles having a glass transition temperature of at least 20° C., from 0 to 60 weight % first soft polymer particles having a glass transition temperature in the range of from −20° C. to 5° C.; and from 0 to 60 weight % first hard-soft polymer particles including first soft polymer phase having a glass transition temperature in the range of from −20° C. to 5° C., and first hard polymer phase having a glass transition temperature of at least 20° C.;

b) optionally, second polymer particles containing: second soft polymer particles having a glass transition temperature in the range of from −20° C. to 5° C., second hard polymer particles having a glass transition temperature of at least 20° C.; or second hard-soft polymer particles containing second soft polymer phase having a glass transition temperature in the range of from −20° C. to 5° C., and second hard polymer phase having a glass transition temperature of at least 20° C. and c) composite particles, wherein each of the composite particles contains: a pigment particle, reacted coupling agents forming first covalent bonds to the pigment particle, and a plurality of first polymer particles in which the reacted complementary functional groups form second covalent bonds with the reacted coupling agents;

wherein the aqueous polymer composition contains, based on total weight of the first polymer particles and the second polymer particles: a total weight % of the first soft polymer particles, first soft polymer phase, the second soft polymer particles, and the second soft polymer phase in the range of from 60 to 98 weight %, and a total weight % of the first hard polymer particles, the first hard polymer phase, the second hard polymer particles, and the second hard polymer phase in the range of from 2 to 40 weight %.

Glass transition temperature or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$, and $w_2$ refer to the weight fraction of the two comonomers, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated using the Fox equation.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; and the term "(meth)acrylamide" refers to either acrylamide or methacrylamide.

As used herein, the term "covalent bond" refers to a bond between two atoms formed by sharing at least one pair of electrons and expressly excludes ionic bonds, hydrogen bonds, bonds formed by adsorption including chemical adsorption and physical adsorption, bonds formed from van der Waals bonds, and dispersion forces.

As used herein, the term "phosphorus acid group" refers to a phosphorus oxo acid having a POH moiety in which the hydrogen atom is ionizable or to the salt of the phosphorus oxo acid. In its salt or basic form, the phosphorus acid group has a metal ion or an ammonium ion replacing at least one acid proton. Included in the definition of the term "phosphorus acid group" are partial esters of phosphorus oxo acids. The partial esters of phosphorus oxo acids, as referred to "partial esters of phosphorus acid" contain at least one POH moiety and a phosphorus ester moiety represented by POR, where R is a group containing a carbon atom bonded to the oxygen atom attached to the phosphorus atom. Examples of phosphorus acid groups include groups formed from phosphinic acid, phosphonic acid, phosphoric acid, pyrophosphinic acid, pyrophosphoric acid, partial esters thereof, and salts thereof.

As used herein, the term "phosphorus acid full-ester group" refers to a phosphorus oxo acid having one or more phosphorus acid moieties, but not containing a POH moiety. Examples of phosphorus acid full-ester groups include full esters of phosphinic acid, phosphonic acid, phosphoric acid, pyrophosphinic acid, and pyrophosphoric acid.

The present invention is directed towards an aqueous polymer composition including pigment particles, first polymer particles, and optional second polymer particles. The aqueous polymer composition includes composite particles formed from the pigment particles and the first polymer particles. Further, the aqueous polymer composition is characterized as having select weight ratios of total hard polymer and total soft polymer. As used herein "hard polymer" refers to polymer having a glass transition temperature of at least 20° C., preferably at least 40° C. As used herein, "soft polymer" refers to polymer having a glass transition temperature in the range of from −20° C. to 5° C., preferably −15° C. to 5° C., and more preferably −10° C. to 5° C.

The composite particles contained in the aqueous polymer composition of this invention, each include a single center pigment particle surrounded by a plurality of first polymer particles. These first polymer particles are attached to the surface of each pigment particle and minimize contact between adjacent pigment particles. The first polymer particles are characterized as containing select functional groups, which allow the attachment of the first polymer particles to the surface of pigment particles to form the composite particles. Suitable select functional groups include complementary functional groups capable of reacting with other functional groups to form covalent bonds to the surface of the pigment particles; and absorbing groups capable of attaching to surfaces of pigment particles. Suitable composite particles include pigment particles having either complete or partial surface coverage of the pigment particles by the first polymer particles, provided that the first polymer particles sufficiently encapsulate the pigment particles to prevent contact between neighboring pigment particles.

The pigment particles are characterized as having an index of refraction that is significantly greater than the index of refraction of the first polymer particle. Suitable pigment particles have an index of refraction of at least 1.8, preferably at least 1.9, and more preferably at least 2.0. The indices of refraction for various materials are listed in *CRC Handbook of Chemistry and Physics*, 80th Edition, D. R. Lide, editor, CRC Press, Boca Raton, Fla., 1999, pages 4-139 to 4-146.

The shape of the pigment particles is not important and can be of any shape provided that the pigment particles scatter photons having wavelengths in some portion of the spectral region of from 750 nanometer (nm) to 300 nm, preferably in some portion of the visible spectral region of from 700 nm to 380 nm. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes preferably have average diameters in the range of from 10 nm to 1 micron, preferably in the range of from 100 nm to 500 nm, and more preferably, in the range of from 200 nm to 300 nm. Pigment particles having nonspherical shapes preferably have average diameters, defined as their maximum dimension, of up to 1 micron, preferably up to 500 nm, and more preferably up to 300 nm. Information about the average diameters of pigment particles is typically provided by pigment particle suppliers.

The pigment particles alternatively have a uniform composition, or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, and zirconia. For example, certain embodiments of titanium dioxide particles suitable for use in coatings of the present invention have a coating of silica and a coating of alumina.

Suitable pigment particles include white pigment particles such as titanium dioxide, zinc oxide, lead oxide, zinc sulfide, lithophone, zirconium oxide, and antimony oxide; and nonwhite pigment particles. Examples of nonwhite pigment particles include iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; and carbon black. Preferred white pigment particles are titanium dioxide and zinc oxide. More preferably, white pigment particles are selected from rutile titanium dioxide and anatase titanium dioxide. Most preferably, the pigment particles are rutile titanium dioxide.

In the first aspect of the present invention, the composite particles are prepared from first polymer particles containing absorbing groups that attach to the surfaces of the pigment particles. Suitable absorbing groups include phosphorus acid groups, phosphorus acid full-ester groups, polyacid sidechain groups, and mixtures thereof.

In the second aspect of the present invention, each composite particle has a plurality of first polymer particles covalently bonded to the pigment particle. The first polymer particles are indirectly attached to the pigment particle through a linkage that has a covalent bond with the surface of the pigment particle and a second covalent bond with the first polymer particle. The linkage is formed from a select coupling agent having a first functional group that reacts to form a first covalent bond with the surface of the pigment particle and a second functional group that reacts with the select functional group of the first polymer particle to form a second covalent bond. The pigment particle that is contained in this composite particle, has a surface containing a substance selected from metals, metal oxides, sulfides, salts, nonmetals, nonmetal sulfides, nonmetal oxides, and combinations thereof. The surface of the pigment particle is the native surface of the pigment particle or a surface having a surface treatment thereon, wherein the surface treatment provides a suitable surface for formation of covalent bonds. The first covalent bond is formed with an atom on or at the surface of the pigment particle, including any optional coating or surface treatment. In the presence of water, the surface of the pigment particle typically has hydroxyl groups. In the composite particles of the second aspect of the invention, the reacted coupling agents are covalently bonded to atoms on or at the surface of the pigment particle by bonds including those selected from: ether bonds, thiol ether bonds, and siloxane ether bonds. Suitable atoms on or at the surface of the pigment particle for forming the first covalent bond include Ti, Al, Zr, Si, Zn, Cr, Sn, Fe, C, and Pb. The first polymer particles are attached to the reacted coupling agents by second covalent bonds containing groups such as esters, amides, ethers, urethanes, thiol ethers, amines, or ureidos.

The first polymer particles contained in the aqueous polymer composition of the invention include first hard polymer particles, optionally first soft polymer particles, and optionally first hard-soft polymer particles. The first hard-soft polymer particles have at least one first hard polymer phase and at least one first soft polymer phase. The first hard polymer particles have a glass transition temperature of at least 20° C. and preferably at least 40° C. For example, suitable first hard polymer particles useful in the aqueous polymer composition have glass transition temperatures in the range of from 20° C. to 200° C., and preferably in the range of from 40° C. to 200° C. The first soft polymer particles have a glass transition temperature in the range of from −20° C. to 5° C., preferably in the range of from −15° C. to 5° C., and more preferably in the range of from −10° C. to 5° C.

The first hard-soft polymer particles contain a first hard polymer phase having a glass transition temperature of at least 20° C., preferably at least 40° C.; and a first soft polymer phase having a glass transition temperature in the range of from −20° C. to 5° C., preferably in the range of from −15° C. to 5° C., and more preferably in the range of from −10° C. to 5° C. One suitable range for the glass transition temperature of the first hard polymer phase is from 20° C. to 200° C., and preferably from 40° C. to 200° C. Typically, the first hard-soft polymer particles contain first hard polymer phase and first soft polymer phase in a weight ratio of 10:1 to 1:10, and preferably 5:1 to 1:5. Suitable morphologies for the first hard-soft polymer particles include core-shell polymer particles in which one polymer phase forms a shell that fully encapsulates a core formed from the other polymer phase; and acorn-type polymer particles in which one polymer phase forms a shell that does not fully encapsulate a core formed from the other polymer phase. The shell may be either the first hard polymer phase or the first soft polymer phase with the core formed from the respective polymer phase. Alternatively, the first hard-soft polymer particles have a "dipole" morphology in which each phase forms separate but connected lobes, such as a first hard-soft polymer particle containing a first hard polymer phase hemisphere and a first soft polymer phase hemisphere. The first hard-soft polymer particle may have a morphology in which one polymer phase forms multiple domains either within or on the surface of the other polymer phase, for example, a first hard-soft polymer particle having a first soft polymer phase with multiple domains of a second hard polymer phase.

The aqueous polymer composition contains from 40 to 100 weight % first hard polymer particles, preferably from 50 to 100 weight % first hard polymer particles, and more preferably, from 60 to 100 weight % first hard polymer particles, based on the weight of the first polymer particles. Further, the aqueous polymer composition contains from 0 to 60 weight % first soft polymer particles, preferably, from 0 to 50 weight % first soft polymer particles, and more preferably from 0 to 40 weight % first soft polymer particles, based on the weight of the first polymer particles. The aqueous polymer composition also contains from 0 to 60 weight % first hard-soft polymer particles, preferably, from 0 to 50 weight % first hard-soft polymer particles, and more preferably from 0 to 40 weight % first hard-soft polymer particles, based on the weight of the first polymer particles.

The first polymer particles used to prepare the composite particle typically have a weight average molecular weight, Mw, of at least 50,000, preferably of at least 250,000, and most preferably of at least 500,000, as measured by gel permeation chromatography. The first polymer particles may have an average particle diameter in the range of from 10 nm to 1 micron, preferably in the range of from 75 nm to 500 nm, and more preferably in the range of from 80 nm to 200 nm. For composite particles containing titanium dioxide as the pigment particle or other pigment particles of similar size, maximum hiding power is typically obtained with first polymer particles having average diameters in the range of from 40 nm to 250 nm, preferably in the range of from 50 nm to 200 nm, and more preferably in the range of from 80 nm to 150 nm. The diameter of the first polymer particles is measured by a quasi-elastic light scattering technique.

The aqueous polymer composition optionally includes second polymer particles. The second polymer particles are selected from second soft polymer particles, second hard polymer particles, second hard-soft polymer particles, or combinations thereof. The second hard polymer particles have a glass transition temperature of at least 20° C. and preferably at least 40° C. For example, suitable second hard polymer particles useful in the aqueous polymer composition have glass transition temperatures in the range of from 20° C. to 200° C., and preferably in the range of from 40° C. to 200° C. The second soft polymer particles have a glass transition temperature in the range of from –20° C. to 5° C., preferably in the range of from –15° C. to 5° C., and more preferably in the range of from –10° C. to 5° C.

The second hard-soft polymer particles contain at least one second hard polymer phase having a glass transition temperature of at least 20° C. and preferably at least 40° C. One suitable range for the glass transition temperature of the second hard polymer phase is from 20° C. to 200° C., and preferably from 40° C. to 200° C. The second hard-soft polymer particles also contain at least one second soft polymer phase having a glass transition temperature in the range of from –20° C. to 5° C., preferably in the range of from –15° C. to 5° C., and more preferably in the range of from –10° C. to 5° C. Typically, the second hard-soft polymer particles contain second hard polymer phase and second soft polymer phase in a weight ratio of 10:1 to 1:10, and preferably 5:1 to 1:5. Suitable morphologies for the second hard-soft polymer particles include core-shell polymer particles, acorn polymer particles, dipole polymer particles, and polymer particles having a polymer phase containing multiple domains of another polymer phase, as mentioned hereinabove for the first hard-soft polymer particles.

Generally, the second polymer particles may have a weight average molecular weight, Mw, of at least 50,000, preferably of at least 250,000, and most preferably of at least 500,000, as measured by gel permeation chromatography. The second polymer particles may have an average particle diameter in the range of from 10 nm to 1 micron, preferably in the range of from 75 nm to 500 nm, and more preferably in the range of from 80 nm to 350 nm. The diameter of the second polymer particles is measured by a quasi-elastic light scattering technique.

The aqueous polymer composition is characterized as containing select ranges of soft polymer and hard polymer. The soft polymer is selected from one or more of the first soft polymer particles, the first soft polymer phase of the first hard-soft polymer particles, the second soft polymer particles, and the second soft polymer phase of the second hard-soft polymer particles. The hard polymer is selected from one or more of the first hard polymer particles, the first hard polymer phase of the first hard-soft polymer particles, the second hard polymer particles, and the second hard polymer phase of the second hard-soft polymer particles. The total weight % soft polymer in the aqueous polymer composition is in the range of from 60 to 98 weight %, preferably, from 70 to 98 weight %, and more preferably, from 80 to 98 weight %, based on the total weight of the soft polymer and the hard polymer in the aqueous polymer composition. The total weight % hard polymer in the aqueous polymer composition is in the range of from 2 to 40 weight %, preferably, from 2 to 30 weight %, and more preferably, from 2 to 20 weight %, based on the total weight of the soft polymer and the hard polymer in the aqueous polymer composition.

TABLE 1

Soft Polymer and Hard Polymer in the Aqueous Polymer Composition

| Polymer Particle | Soft Polymer | Hard Polymer |
| --- | --- | --- |
| First Hard Polymer Particles | — | First Hard Polymer Particles |
| First Soft Polymer Particles | First Soft Polymer Particles | — |
| First Hard-Soft Polymer Particles | First Soft Polymer Phase | First Hard Polymer Phase |
| Second Hard Polymer Particles | — | Second Hard Polymer Particles |
| Second Soft Polymer Particles | Second Soft Polymer Particles | — |
| Second Hard-Soft Polymer Particles | Second Soft Polymer Phase | Second Hard Polymer Phase |
| Range (based on total weight of First Polymer and Second Polymer) | 60 to 98 wt. % | 2 to 40 wt. % |

As used herein, "polymer particles" refers to one or more of the first hard polymer particles, the first soft polymer particles, the first hard-soft polymer particles, the second soft polymer particles, the second hard polymer particles, and the second hard-soft polymer particles.

As used herein, "polymer component" refers to one or more of the first hard polymer particles, the first soft polymer particles, the first hard-soft polymer particles, the first hard polymer phase, the first soft polymer phase, the second hard polymer particles, the second soft polymer particles, the second hard-soft polymer particles, the second hard polymer phase, and the second soft polymer phase.

As used herein, "soft polymer component" refers to one or more of the first soft polymer particles, the first soft polymer phase of the first hard-soft polymer particles, the second soft polymer particles, and second soft polymer phase of the second hard-soft polymer particles.

As used herein, "hard polymer component" refers to one or more of the first hard polymer particles, the first hard polymer phase of the first hard-soft polymer particles, the second hard polymer particles, and the second hard polymer phase of the second hard-soft polymer particles.

As used herein, "hard-soft polymer particles" refers to one or more of the first hard-soft polymer particles and the second hard-soft polymer particles.

As used herein, "polymer phase" refers to one or more of the first hard polymer phase, the first soft polymer phase, the second hard polymer phase, and the second soft polymer phase.

The first polymer particles and the second polymer particles are typically addition polymers prepared by the polymerization of one or more ethylenically unsaturated first monomers. Examples of suitable first monomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$-$C_{40}$ alkyl esters of (meth)acrylic acid, such as methyl(meth)acrylate, ethyl(meth)acrylate, n-butyl (meth)acrylate, 2-ethylhexyl (meth)acrylate, cyclohexyl(meth)acrylate, n-octyl(meth) acrylate, n-decyl(meth)acrylate, n-dodecyl(meth)acrylate, tetradecyl(meth)acrylate, lauryl(meth)acrylate, oleyl(meth) acrylate, palmityl(meth)acrylate, and stearyl(meth)acrylate; other(meth)acrylates such as isobornyl(meth)acrylate, benzyl(meth)acrylate, phenyl(meth)acrylate, 2-bromoethyl (meth)acrylate, 2-phenylethyl(meth)acrylate, and 1-naphthyl(meth)acrylate, alkoxyalkyl(meth)acrylate, such as ethoxyethyl(meth)acrylate, mono-, di-, trialkyl esters of ethylenically unsaturated di- and tricarboxylic acids and anhydrides, such as ethyl maleate, dimethyl fumarate, and ethyl methyl itaconate; and carboxylic acid containing monomers such as(meth)acrylic acid, itaconic acid, fumaric acid, and maleic acid. Alternatively, the first monomer includes at least one multi-ethylenically unsaturated monomer effective to raise the molecular weight and crosslink the polymer particle. Examples of multi-ethylenically unsaturated monomers that are utilizable include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene. One or more of the polymer particles may contain from 0.1 to 2 weight % of itaconic acid and 0.1 to 2 weight % of acrylamide, based on the weight of that polymer particle. Suitable second polymers include vinyl acetate-acrylate copolymers, vinyl acetate polymers, and ethylene vinyl acetate polymers.

In one aspect of the present invention, the first polymer particles contain pendant phosphorus acid groups. These first polymer particles are addition polymers and are typically prepared by the polymerization of at least one first monomer and at least one ethylenically unsaturated monomer containing a pendant phosphorus acid group, referred to herein as "phosphorus acid monomer". The phosphorus acid monomer is alternatively in the acid form or as a salt of the phosphorus acid group. Examples of phosphorus acid monomers include:

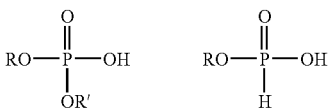

-continued

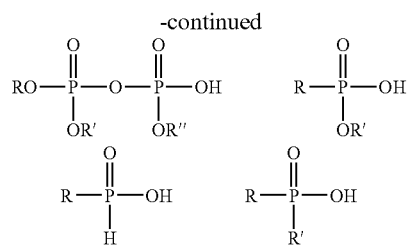

wherein R is an organic group containing an acryl, methacryl, or a vinyl group; and R' and R" are independently selected from H and a second organic group. The second organic group is alternatively saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl)fumarate or itaconate, derivatives of (meth)acrylic acid esters, such as, for example phosphates of hydroxyalkyl(meth) acrylates including 2-hydroxyethyl(meth)acrylate, 3-hydroxypropyl(meth)acrylates, and the like. Other suitable phosphorus acid monomers are phosphonate functional monomers, such as are disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus acid monomers are 1,2-ethylenically unsaturated (hydroxy)phosphinylalkyl(meth)acrylate monomers, such as are disclosed in U.S. Pat. No. 4,733,005, and include (hydroxy)phosphinylmethyl methacrylate. Other suitable phosphorus acid monomers are dihydrogen phosphate monomers, which include 2-phosphoethyl(meth)acrylate, 2-phosphopropyl(meth) acrylate, 3-phosphopropyl(meth)acrylate, and 3-phospho-2-hydroxypropyl(meth)acrylate.

In one alternative embodiment, the phosphorus acid monomer is treated prior to polymerization to remove impurities such as saturated compounds containing phosphorus acid groups and salts thereof. Examples of saturated compounds containing phosphorus acid groups include inorganic phosphates, phosphoric acid, phosphorous acid, and 2-hydroxy ethyl ester of phosphoric acid, and their salts.

In another aspect of the present invention, the first polymer particles contain pendant phosphorus acid full-ester groups. These first polymer particles are addition polymers and are typically prepared by the polymerization of at least one first monomer and at least one ethylenically unsaturated monomer containing a pendant phosphorus acid full-ester group, referred to herein as "phosphorus acid full-ester monomer". Examples of phosphorus acid full-ester groups include monoesters, diesters, and triesters of phosphorus acids. Phosphorus acid full-ester groups exclude phosphorus acid groups having ionizable hydrogen atoms or the salts thereof. Examples of phosphorus acid full-ester monomers include:

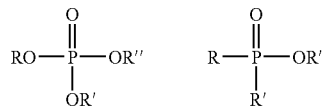

-continued

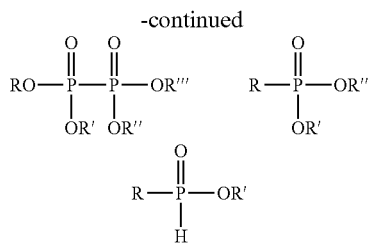

wherein R is an ethylenically unsaturated organic group such as an acryloxy, methacryloxy, or a vinyl group; and R', R", and R'" are independently selected from a second organic group. The second organic group is alternatively saturated or unsaturated. Suitable phosphorus acid full-ester monomers include trivinyl phosphate; (2-methacryoloxy) ethyl-diethyl-phosphate; di(4-methacrylolxy)butyl-methyl-phosphate; vinyl phosphonic acid, diethyl ester; and glycerol monoacrylate, di(diethylphosphate)ester.

In still another aspect of the present invention, the first polymer particles contain pendant polyacid sidechain groups. Polyacid sidechain groups are branches to the polymer backbone that contain at least four units of polymerized ethylenically unsaturated monomer, wherein at least half of the polymerized monomer units have an acid group pendant to the polymer sidechain. Suitable acid groups include carboxylic acids and phosphorus acids. As used herein, the definition of polyacid sidechain groups include salts of the acid groups. Suitable salts include ammonium salts, alkali metal salts such as sodium and potassium salts, and salts formed from organic bases such as diethanol amine and triethanol amine.

The first polymer particles containing acid sidechain groups are addition polymers and are typically prepared by the polymerization of at least one first monomer and at least one acid macromonomer. As used herein, acid macromonomer refers to an oligomer with a terminal unsaturation and having monomers with acid groups as polymerized units. The terminal unsaturation and the section of the acid macromonomer with the acid groups are attached directly or alternatively, attached through a linker group. Suitable acid macromonomers are:

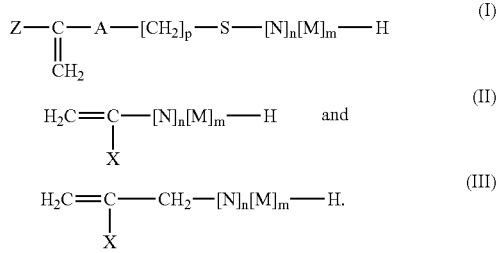

wherein N is the polymerized residue of an ethylenically unsaturated carboxylic acid monomer and has the formula:

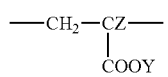

or N is the polymerized residue of a phosphorus acid monomer or a phosphorus acid full-ester monomer;

wherein M is the residue of a second ethylenically unsaturated monomer and has the formula

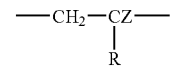

wherein the N and M residues are randomly arranged in the acid macromonomer; wherein m is the total number of M residues in the acid macromonomer and is in the range of 0 to 150; wherein n is the total number of N residues in the acid macromonomer and is in the range of 4 to 300; wherein n is greater than or equal to m; wherein the sum of n and m is in the range of 4 to 300; wherein A is a linker group selected from ester, urethane, amide, amine, and ether linkages; wherein p is in the range of 1 to 20; wherein X is selected from —COOY and R; wherein R is selected from phenyl radicals, substituted phenyl radicals, —CONH$_2$, —CONHR', —CONR'R', —CN, —CCOR', —OCOR', —Cl, and mixtures thereof, wherein R' is an alkyl or alkoxyalkyl radical independently selected from branched, unbranched, or cyclic hydrocarbon radicals having 1 to 18 carbon atoms; wherein Y is independently selected from H, NH$_4$, alkali metals and alkaline earth metals; and wherein each Z is independently selected from H and CH$_3$.

One method to prepare the acid macromonomers is polymerization of at least one monomer having an acid group and optionally at least one other first monomer. Suitable monomers having acid groups include phosphorus acid monomer; and ethylenically unsaturated carboxylic acid monomers such as acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid. Preferred ethylenically unsaturated carboxylic acid monomers are acrylic acid and methacrylic acid. The acid macromonomers contain as polymerized units from 50 to 100 mole percent monomer having an acid group, preferably from 70 to 100 mole percent, and most preferably from 90 to 100 mole percent of these monomers.

Various conventional polymerization methods are suitable for preparing the acid macromonomers including anionic polymerization as disclosed in U.S. Pat. No. 4,158,736; radical polymerization with chain transfer agents such as cobalt complexes as described in U.S. Pat. No. 5,324,879; catalytic chain transfer polymerization with terminally unsaturated acid macromonomers used as chain transfer agents as described in U.S. Pat. No. 5,362,826; and high temperature radical polymerization as described in U.S. Pat. No. 5,710,227. Alternatively, the acid macromonomers are prepared by conventional radical polymerization using a hydroxy-functional chain transfer agent such as 2-mercaptoethanol or an amine-functional chain transfer agent followed by the reaction of the hydroxyl group or the amine group with an ethylenically unsaturated monomer having a complementary reactive group to attach the terminal unsaturation. Examples of ethylenically unsaturated monomers with a complementary reactive group include glycidyl (meth)acrylate, isocyanatoethyl(meth)acrylate, or (meth) acrylic acid. The ethylenically unsaturated monomers with a complementary reactive group are attached to the fragment of the hydroxy-functional or amine-functional chain transfer agent by various linkages including ether, urethane, amide, amine, urea, or ester linkages. Bulk, solution, and emulsion polymerization using batch, semicontinuous, or continuous processes are suitable for preparation of the acid macromonomer.

Another method to prepare the acid macromonomers is polymerization of esters of ethylenically unsaturated carboxylic acid monomers such as ethyl acrylate, butyl acrylate, or methyl methacrylate followed by the partial or complete hydrolysis of the ester groups to obtain the carboxylic acid functionalities.

In the first aspect of the present invention, the first hard-soft polymer particles contain polymerized units of the phosphorus acid monomer, the phosphorus acid full-ester monomer, the acid macromonomer, or mixtures thereof in the first hard polymer phase, the first soft polymer phase, or in both phases.

In one embodiment, the first polymer particles contain as polymerized units, from 0.1 weight % to 20 weight %, preferably from 0.5 to 15 weight %, and more preferably from 1 to 10 weight %, phosphorus acid monomer, phosphorus acid full-ester monomer, acid macromonomer, or mixtures thereof, based on the weight of the first polymer particles. An aqueous dispersion containing the first polymer particles having phosphorus acid groups, phosphorus acid full-ester groups, polyacid sidechain groups, or mixtures thereof, typically has a pH in the range of 3 to 10.

In the second aspect of the present invention, the aqueous polymer composition is prepared from first polymer particles having complementary functional groups. These complementary functional groups are reacted to prepared covalently bonded composite particles, in which the first polymer particles are attached by covalent bonds to the surfaces of the pigment particles. Examples of suitable complementary functional groups include acetoacetoxy groups, 1,3-dicarbonyl groups, aldehydes, acids, amines, epoxides, isocyanates, thioranes, isothiocyanates, alcohols, carbodiimides, aziridines, haloalkanes, and halophenyls. The complementary functional groups are incorporated into the polymer particle by polymerization of a reaction mixture containing an ethylenically unsaturated monomer having a complementary functional group and at least one first monomer. Examples of ethylenically unsaturated monomers having a complementary functional group are isocyanate monomers, such as isocyanato ethyl methacrylate, dimethyl meta-isopropenyl benzyl isocyanate; acetoacetoxy monomers, such as acetoacetoxy ethyl (meth)acrylate; aldehyde monomers, such as acrolein and methacrolein; amine monomers, such as t-butyl aminoethyl(meth)acrylate, dimethyl aminoethyl(meth)acrylate, aminobutyl(meth)acrylate, aminoethyl (meth)acrylate; aminopropyl(meth)acrylate; and oxazolidinoethyl(meth)acrylate; epoxy monomers, such as glycidyl (meth)acrylate; carboxylic acid monomers, such as(meth) acrylic acid, itaconic acid, fumaric acid, maleic acid, β-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid; hydroxy containing monomers, such as hydroxyalkyl(meth)acrylates including 2-hydroxyethyl (meth)acrylate and 3-hydroxypropyl(meth)acrylate; halogenated monomers, such as bromopropyl(meth)acrylate; and halomethyl-styrene.

In the second aspect of the present invention, the optional first hard-soft polymer particles contain polymerized units of the ethylenically unsaturated monomers having a complementary functional group in the first hard polymer phase, the first soft polymer phase, or in both phases.

Various polymerization processes are suitable for the preparation of the polymer particles. Suitable polymerization processes include bulk, precipitation, suspension, or emulsion polymerization techniques. The polymerization may be a single stage process or a multi-stage process. Preparation by bulk or precipitation polymerization techniques is followed by dispersion of the polymer into an aqueous medium to prepare a dispersion of the polymer particles. Emulsion polymerization techniques are typically employed to prepare the polymer particles. The practice of emulsion polymerization is discussed in detail in D. C. Blackley, *Emulsion* Polymerization (Wiley, 1975) and in H. Warson, *The Applications of Synthetic Resin Emulsions*, Chapter 2 (Ernest Benn Ltd., London 1972).

The hard-soft polymer particles are typically prepared by a multi-stage polymerization process. In this process, for example, the hard polymer phase is prepared as polymer particles dispersed in an aqueous medium. Next, the soft polymer phase is polymerized in the presence of the particles of the hard polymer phase to provide hard-soft polymer particles. Alternatively, the soft polymer phase is prepared first, and the hard polymer phase is prepared in the presence of the particles of the hard polymer phase. Contemplated are multi-stage polymerization processes that prepare the hard-soft polymer particles with more than two phases, such as a hard-soft polymer particle containing one hard phase and two soft polymer phases, wherein each of the two soft polymer phases have different polymer compositions.

Conventional surfactants are optionally used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. Combinations of anionic and nonionic surfactants may also be used. The amount of surfactant used is usually 0.1% to 10% by weight, based on the weight of monomers. High molecular weight polymers such as hydroxy ethyl cellulose, methyl cellulose, and vinyl alcohol may be used as emulsion stabilizers and protective colloids, as may polyelectrolytes such as polyacrylic acid. Acidic monomers particularly those of low molecular weight, such as acrylic acid and methacrylic acid, are water soluble, and thus may serve as dispersing agents which aid in emulsifying the other monomers used.

Another optional synthesis adjuvant is a chain transfer agent, which moderates the molecular weight of the polymer particles. Suitable chain transfer agents include, for example, alcohols such as isopropanol, isobutanol, t-octyl alcohol, and lauryl alcohol; halogenated compounds such as carbon tetrachloride, tetrachloroethylene, and trichlorobromoethane; n-butyl mercaptan, n-amyl mercaptan, n-dodecyl mercaptan, t-dodecyl mercaptan, alkyl thioglycolate, mercaptopropionic acid, and alkyl mercaptoalkanoate. Generally, an amount of chain transfer agent from 0.001 to 0.05, preferably 0.0025 to 0.05 moles per kg weight of the polymer particles, is used. Linear or branched $C_4$-$C_{22}$ alkyl mercaptans such as n-dodecyl mercaptan and t-dodecyl mercaptan are preferred. Methods to add the chain transfer agent(s) include one or more additions, which are continuous, linear, or not, over most or all of the entire reaction period or during limited portion(s) of the reaction period such as, for example, in the kettle charge and in the reduction of residual monomer stage.

The polymerization process to prepare the polymer particles may be a thermal or redox type; that is, free radicals may be generated solely by the thermal dissociation of an initiator species or a redox system may be used. Typically, the monomer mixture is added neat or alternatively as an emulsion in water. A monomer emulsion containing all or some portion of the monomers to be polymerized may be prepared using the monomers, water, and surfactants. Methods to add the monomer mixture include one or more additions, and continuous addition; wherein the addition of the monomer is, linear or not, over the reaction period, or combinations thereof. A catalyst solution containing catalyst in water may be separately prepared. The monomer emulsion and catalyst solution may be cofed into the polymerization vessel over the course of the emulsion polymerization. The reaction vessel itself may initially contain water. The reaction vessel may also additionally contain seed emulsion and further may additionally contain an initial charge of the polymerization catalyst. Seeded polymerization tends to yield aqueous dispersions of polymer having more uniform physical properties than unseeded polymerization. Several monomer emulsions may be simultaneously cofed into the reaction vessel. When multiple monomer emulsions are cofed, they may be of different monomer compositions. The sequence and rates at which the different monomer emulsions are cofed may be altered during the emulsion polymerization process. The pH of the contents of the reaction vessel may also be altered during the course of the emulsion polymerization process. The pH of the emulsion polymerization process to prepare the first polymer or the second polymer is generally less than 7. The reaction temperature for emulsion polymerization is typically maintained at a temperature lower than 100° C. throughout the course of the reaction. Preferred is a reaction temperature between 30° C. and 95° C., more preferably between 50° C. and 90° C.

A polymerization initiator of the free radical type, such as ammonium or potassium persulfate, may be used alone or as the oxidizing component of a redox system, which also includes a reducing component such as potassium metabisulfite, sodium thiosulfate, or sodium formaldehyde sulfoxylate. The reducing component is frequently referred to as an accelerator. The polymerization temperature is typically optimized for the catalyst system employed.

In one embodiment, a redox polymerization process employing a redox initiation system that includes at least one initiator, which is commonly referred to as an oxidant, and one or more reductants is used to prepare at least one of the polymer particles or at least one of the polymer phases contained in the hard-soft polymer particles. Suitable oxidants for the redox polymerization include, for example, hydrophilic initiators such as hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, ammonium or alkali metal salts of peroxydisulfuric acid; and hydrophobic initiators such as t-alkyl hydroperoxides including t-amyl hydroperoxide, t-alkyl peroxides, or t-alkyl peresters wherein the t-alkyl group includes at least 5 carbon atom. Typical oxidant levels are in the range of from 0.01% to 3.0% by weight, based on total weight of monomers. Examples of the at least one suitable reductant include, for example, sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, hydroxymethanesulfonic acid, amines such as ethanolamine, glycolic acid, glyoxylic acid hydrate, ascorbic acid, isoascorbic acid, lactic acid, glyceric acid, maleic acid, 2-hydroxy-2-sulfinatoacetic acid, tartaric acid, and salts of the preceding acids, typically at a level of 0.01% to 3.0% by weight, based on dry polymer weight, is used. Redox reaction catalyzing metal salts of iron, copper, manganese, silver, platinum, vanadium, nickel, chromium, palladium, or cobalt are optionally used. Examples of redox catalyst systems include t-butyl hydroperoxide/sodium formaldehyde sulfoxylate/Fe(II) and ammonium persulfate/sodium bisulfite/sodium hydrosulfite/Fe(II). The oxidant and optional reductant are typically added to the reaction mixture together, in separate feeds, in one or more shots, or gradually, whether uniformly or not, or in combinations thereof or variations thereon as is desired. They are typically added neat, in solution, or emulsified in an appropriate medium. Preferably, the oxidant and the optional reductant are added concurrently with the monomer mixture. The redox polymerization is preferably carried out at pH of 4 to 8. In one example, the first soft polymer particles, the second soft polymer particles, the first soft polymer phase, or the second soft polymer phase are prepared by a redox polymerization process.

In another embodiment, at least one of the polymer particles or at least one of the polymer phases contained in the hard-soft polymer particles are prepared by a redox polymerization process in which at least 40% by weight, preferably at least 75% by weight, more preferably at least 95% by weight, of that polymer particle or that polymer phase, based on the weight of that polymer particle or that polymer phase, is formed by redox polymerization. Preferably, the last 40 weight %, more preferably the last 75 weight %, and most preferably the last 95 weight % of that polymer particle or that polymer phase, based on the weight of that polymer particle or that polymer phase, is formed by redox polymerization. For example, in the preparation of the first hard-soft polymer particles, at least 40% by weight, preferably at least 75% by weight, more preferably at least 95% by weight of the first soft polymer phase, based on the weight of that first soft polymer phase, is prepared by a redox polymerization process. The redox polymerization is contemplated to include embodiments where some of the polymer is introduced by a polymer seed, formed in situ or not, or formed during hold periods or formed during periods wherein the monomer feed has ended and residual monomer is being converted to polymer. In an example, at least one soft polymer composition selected from the first soft polymer particles, the second soft polymer particles, the first soft polymer phase, or the second soft polymer phase is prepared by the redox polymerization process of this embodiment.

In certain embodiments of the redox process to prepare one or more of the polymer particles or one or more of the polymer phases, it is advantageous to choose an oxidant mixture containing one hydrophilic initiator and the hydrophobic initiator in order to increase the overall efficiency of the initiator system with regard to the initiation of the full range of hydrophilic and hydrophobic monomers. Preferably the hydrophilic initiator is less than 50% by weight of the total amount of oxidant mixture. The redox process of this embodiment optionally includes at least one suitable reductant such as those listed hereinabove.

In a further embodiment of the redox process, at least one of the polymer particles or at least one of the polymer phases are prepared by a redox process in which at least 40% by weight, preferably at least 75% by weight, more preferably at least 95% by weight of that based on the weight of that polymer particle or that polymer phase, of that polymer particle or that polymer phase is formed by redox polymerization in the presence of 0.001 to 0.05 moles chain transfer agent per kg of weight of that polymer particle or that polymer phase. By "at least 40% by weight, based on weight of that polymer particle or that polymer phase is formed by redox polymerization in the presence of 0.001 to 0.05 moles chain transfer agent per kg dry polymer weight" is meant herein that at least 40% by weight, based on weight of that polymer particle or that polymer phase is formed by redox emulsion polymerization and that this polymerization is effected contemporaneously with the prior presence and/or addition of a total of 0.001 to 0.05 moles chain transfer agent per kg of weight of that polymer particle or that polymer phase.

Another method to prepare the polymer particles or at least one of the polymer phases is a polymerization process having controlled conversion of the monomer to polymer. In this controlled conversion process, the monomer is added to an aqueous reaction medium and polymerized in the presence of excess unreacted monomer to form the polymer particles or the polymer phase. As used herein, "excess unreacted monomer" refers to a level of at least 5 weight % added monomer that has remained unreacted, based on the accumulated weight of added monomer. The accumulated weight of the added monomer is the total weight of monomer added to the aqueous reaction medium starting from the initial introduction of monomer into the reaction vessel. The excess unreacted monomer is equal to the accumulated weight of the added monomer minus the weight of the polymer formed from the added monomer, provided that there are no other significant pathways to remove the monomer from the aqueous reaction medium or decompose the unreacted monomer. In the description of the controlled conversion process, the use of the term "monomer" refers to the one or more monomers that are polymerized to prepare the polymer particles or the polymer phase, and "added monomer" refers to the monomer that has been added to the aqueous reaction medium. In the present method, at least 40 weight % of each of the polymer particles or the polymer phase is prepared in the presence of excess unreacted monomer. Preferably, at least 60 weight % of the polymer particles or polymer phase, and more preferably at least 90 weight % of the polymer particles or the polymer phase are prepared in the presence of excess unreacted monomer.

The weight % unreacted monomer in the aqueous reaction medium is determined by measuring the concentration of unreacted monomer during the polymerization process. Aliquots of the aqueous reaction mixture are removed at various intervals during the polymerization process and a sufficient amount of polymerization inhibitor is added to the aliquots to prevent subsequent polymerization of the unreacted monomer. Gas chromatography techniques with appropriate standards and detectors are employed for determining quantitatively the percentages by weight of unreacted monomer in the aliquots. The weight % reacted monomer is calculated using formula I:

$$\text{weight \% unreacted monomer in aliquot}(i) = 100 \times [M_u]_i/[M_a]_i \quad (I)$$

wherein: $[M_u]_i$ is the concentration of unreacted monomer in units of grams of monomer per gram of total materials added to the reaction vessel at the time that aliquot(i) was removed from the aqueous reaction medium, and $[M_a]_i$, is the concentration of the accumulated weight of monomer per gram of total materials added to the reaction vessel at the time aliquot(i) was removed from the aqueous reaction medium. The total weight of materials added to the reaction vessel includes the weights of monomer(s), water, and optional materials such as surfactants, solvents, catalysts, and initiators. The value of $[M_a]_i$ is calculated from the amount of monomer added to the reaction vessel and the amount of total materials added to the reaction vessel at the time aliquot(i) is removed. At least four aliquots are collected at intervals based on the weight % of total monomer used in the polymerization process to prepare the polymer particles or the polymer phase. Preferably the aliquots are collected at evenly spaced intervals.

For example, using the controlled conversion polymerization process, the second soft polymer particles are prepared by polymerization of 700 g ethyl acrylate, 200 g methyl methacrylate, and 100 g methacrylic acid. The total amount of monomer, 1000 g, is added to the aqueous reaction mixture over a four hour feed time. The amount of unreacted added monomer is measured after each interval of 100 g addition of monomer. The level of unreacted monomer in the polymerization is:

|  | Accumulated Added Monomer (g) | | | | | | | | | |
| --- | --- | --- | --- | --- | --- | --- | --- | --- | --- | --- |
|  | 100 | 200 | 300 | 400 | 500 | 600 | 700 | 800 | 900 | 1000 |
| Weight % of added monomer | 10 | 20 | 30 | 40 | 50 | 60 | 70 | 80 | 90 | 100 |
| Weight % unreacted monomer | 7.3 | 6.6 | 6.2 | 7.0 | 5.5 | 5.2 | 4.8 | 6.0 | 7.0 | 1.0 |

The condition of at least 5 weight % unreacted monomer occurs in the polymerization during the first 60 weight % of monomer addition and between 70 and 90 weight % of the monomer addition. In this example, at least 80 weight % of each of the second soft polymer particles is prepared in the presence of excess unreacted monomer.

Examples of controlled conversion processes include redox polymerization processes and polymerization processes utilizing thermal activated initiators. Suitable thermally activated initiators include but are not limited to hydrophilic initiators listed hereinabove. Suitable initiators for controlled conversion processes having redox polymerization include but are not limited to oxidants listed hereinabove.

In the controlled conversion process, various techniques are suitable for achieving the reaction conditions having excess unreacted monomer. One technique is the addition of one or more substances with the ability to inhibit the polymerization such as a polymerization inhibitor. Examples of polymerization inhibitors are aerobic polymerization inhibitors such as hydroquinones and other phenolic materials including 2-nitrophenol, 4-nitrophenol, and 1-nitroso-2-naphthol; oxygen; and amines such as N,N-diethylhydroxylamine and p-phenylenediamine. Other suitable polymerization inhibitors are anaerobic inhibitors such as nitroso compounds including p-nitrosophenol, N-nitrosodiphenylamine, t-nitrosobutane, and t-nitrosooctane; and quinones such as 1,4-benzoquinone, 1,4-napthoquinone, and 2,6-dichlorobenzoquinone. Still other suitable polymerization inhibitors are n-oxyl radicals such as those disclosed, for example, in EP 135,280, DE 19,651,307, U.S. Pat. No. 5,322,912, U.S. Pat. No. 4,581,429, U.S. Pat. No. 5,412,047, and DE 19,727,502. Examples of suitable N-oxyl radicals include 2,2,6,6-tetramethylpiperidin-1-oxyl; 4-hydroxy-2,2,6,6-tetramethylpiperidin-1-oxyl; 4-hydroxy-2,6-diphenyl-2,6-dimethylpiperidin-1-oxyl; 4-carboxy-2,2,6,6-tetramethylpiperidin-1-oxyl; 4-carboxy-2,6-diphenyl-2,6-dimethylpiperidin-1-oxyl; 3-carboxy-2,2,5,5-tetramethylpyrrolidin-1-oxyl; 3-carboxy-2,5-diphenyl-2,5-dimethylpyrrolidin-1-oxyl; and sodium or potassium salts of the sulfuric acid monoester of 4-hydroxy-2,2,6,6-tetramethylpiperidin-1-oxyl. Some N-oxyl radicals are soluble in water or soluble in water with adjustment of pH; others are dissolved in the monomer used in the polymerization reaction. Typical levels of polymerization inhibitor are in the range of from 20 to 1500 ppm, preferably in the range of from 50 to 1000 ppm, more preferably in the range of from 250 to 1000 ppm, based on the weight of the added monomer.

Alternatively, an inhibitory monomer is added to the aqueous reaction medium to slow the rate of polymerization. An inhibitory monomer is a monomer that has a slow copolymerization rate with the another monomer that is used in the polymerization process. Suitable inhibitory monomers for acrylates include 1,1 diphenyl ethylene; styrenics such as styrene, alkyl styrenes, sodium vinyl sulfonate, halostyrenes, alkoxystyrenes, and nitrosostyrenes; vinyl toluenes; vinyl naphthalenes; vinyl anilines; vinyl pyridines; (meth)acrylonitrile; acetoxyacrylonitrile; fumaronitrile; maleates such as dialkyl maleates including diethyl maleate, di-i-propyl maleate, and di-i-butyl maleate; and alkyl acid maleates including ethyl acid maleate, dibenzyl maleate, and diethylchloromaleate; fumarates such as dialkyl fumarates including dimethyl fumarate, diethyl fumarate, di-n-butyl fumarate, and di-2-ethylhexyl fumarate; and alkylacid fumarates including ethyl acid fumarate, butanediol fumarate, and ethyleneglycol fumarate; crotonates such as alkyl crotonates including ethyl crotonate, n-propyl crotonate, and n-butyl crotonate, crotonaldehyde, crotonamide, and crotonic acid.

Another technique to provide reaction conditions of excess unreacted monomer include polymerization in the presence of select catalytic chain transfer agents such as cobalt catalysts as disclosed in European Patent No. 822944 B1 or European Patent No. 1138730 A2.

A further technique to provide excess unreacted monomer is to limit the polymerization rate of the added monomer by employing lower levels of initiator or lower polymerization temperatures.

In one embodiment of the present invention, at least one of the polymer particles or at least one of the polymer phases are prepared by a thermally initiated controlled conversion process in which the level of thermally activated initiator is adjusted so as to keep the level of unreacted added monomer in the aqueous reaction medium at a level of at least 5 weight %, based on the accumulated weight of added monomer, during the polymerization of at least 40 weight % of each of the soft polymer particles. One method to introduce the thermally activated initiator to the aqueous reaction medium is cofeeding the thermally activated initiator along with the monomer. Suitable thermally activated initiators include but are not limited to hydrophilic oxidants In one embodiment of the controlled conversion process, at least 40 weight %, preferably at least 80 weight %, and more preferably at least 95 weight % of each of the soft polymer particles is prepared by a one shot or multiple shot polymerization process. By a one shot polymerization process it is meant that at least 40 weight %, preferably at least 80 weight %, and more preferably at least 95 weight % of the monomers to be polymerized to form the soft polymer particles are added to the reaction vessel. After addition of this monomer charge to reaction vessel, the polymerization is initiated using either a thermally activated initiator or a redox activated initiator. Thermally activated initiators are activated by increasing the temperature of the aqueous reaction medium containing the added monomer and the thermally activated initiator. Redox activated initiators are activated by adding either the reductant or the oxidant component of the redox reaction; adding both simultaneously in separate feeds; or adding an appropriate metal ion catalyst. In the case of a multiple shot polymerization, a series of one shot polymerizations as described above are performed so as to polymerize at least 40 weight % of the monomer of the soft polymer particles under a condition of excess unreacted monomer. Typical shot polymerization processes are disclosed in Rohm and Haas publication CM-104A/cf.

In the controlled conversion process or the redox process, the level of unreacted monomer remaining after the formation of the soft polymer particles is typically reduced by various techniques known in the polymerization arts. Examples of such techniques include addition of one or more charges of initiator to polymerize the residual monomer, or removal of the unreacted monomer by distillation or steam stripping, as disclosed in U.S. Pat. No. 6,348,636.

In one embodiment, after 90-99.7%, preferably 95-99.7%, of the monomers by weight, based on the total weight of the soft polymer particles, have been converted to polymer, at least half of the remaining monomer is converted to polymer in the presence of 0.01-3.0%, by weight based on the total weight of the soft polymer particles, of t-alkyl hydroperoxide, t-alkyl peroxide, or t-alkyl perester wherein the t-alkyl group includes at least 5 carbon atoms; preferably in the presence of 0.01-1.0%, by weight based on the total weight of the soft polymer particles, of t-alkyl hydroperoxide wherein the t-alkyl group includes at least 5 carbon atoms; and more preferably in the presence of 0.01-1.0%, by weight based on the total weight of the soft polymer particles, of t-amyl hydroperoxide. This part of the reaction is typically effected as soon as 90-99.7 weight %, preferably 95-99.7 weight %, conversion of the monomers to polymer is completed in the same reaction vessel or kettle. Alternatively, it is effected after a period of time, in a different reaction vessel or kettle, or at a different temperature than the preceding part of the polymerization. Preferred is the presence of t-alkyl hydroperoxide, t-alkyl peroxide, or t-alkyl perester wherein the t-alkyl group includes at least 5 carbon atoms only after 90%, more preferably only after 95%, conversion of the monomers to polymer is completed. Suitable polymerization processes to prepare the soft polymer particles include redox polymerization and polymerization in the presence of excess unreacted monomer.

Although not wanting to be bound by theory, it is believed that these polymerization processes provide reaction conditions that reduce the formation of branch points on the backbone of the soft polymer. The resulting soft polymer particles have a higher degree of linearity and improved film formation characteristics than conventional polymers that are not prepared by these select processes.

In one embodiment, the first polymer particles containing phosphorus acid groups as the functional group are prepared by polymerization of phosphorus acid monomer in an aqueous reaction medium having a pH of less than 2, preferably less than or equal to about 1.7, and more preferably less than or equal to about 1.5. Suitable pH ranges for the low pH polymerization of the phosphorus acid monomer include pH values in the range of from about −1 to less than about 2, preferably from about −1 to less than about 1.8, and more preferably from about −1 to about 1.5. In a further embodiment, the first polymer particles containing phosphorus acid groups are prepared by the polymerization of phosphorus acid monomer at a pH in the range of from 0 to less than about 1.8, preferably in the range of from 0 to about 1.7, and more preferably in the range of from 0 to about 1.6. The pH of the aqueous reaction medium is adjusted to a low pH by the addition of strong acids, such as sulfuric acid; sulfurous acid; alkyl sulfonic acids, such as methyl sulfonic acid and alkyl ethylene oxide sulfonic acids; aryl sulfonic acids, such as benzosulfonic acid; dodecyl benzene sulfonic acid; and naphthalene sulfonic acid; sulfamic acid; hydrochloric acid; iodic acid; periodic acid; selenic acid; chromic acid; nitric acid; pyrophosphoric acid; trifluoroacetic acid; dichloroacetic acid; trichloroacetic acid; dihydroxymalic acid; dihydroxytartaric acid; maleic acid; oxalic acid; and trihydroxybenzoic acid.

In one embodiment of the present invention, at least one of the polymer particles contains as aldehyde reactive group-containing monomer. By "aldehyde reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically unsaturated aldehyde reactive group-containing monomers are, for example, vinyl acetoacetate, acetoacetoxyethyl(meth) acrylate, acetoacetoxypropyl(meth)acrylate, allyl acetoacetate, acetoacetoxybutyl(meth)acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth)acryloxyethyl)-morpholinone-2,2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, 3-(4-pyridyl)propyl(meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl(meth)acrylate, 2-(meth)acryloxyethyldimethyl-β-propiobetaine, diethanolamine monovinyl ether, o-aniline vinyl thioether, (meth)acryloxyacetamido-ethylethyleneurea, ethyleneureidoethyl(meth) acrylate, (meth)acrylamidoethyl-ethyleneurea, (meth)acrylamidoethyl-ethylenethiourea, N-((meth)acrylamidoethyl)-N-(1-hydroxymethyl)ethyleneurea, N-((meth) acrylamidoethyl)-N-(1-methoxy)methylethyleneurea, N-formamidoethyl-N-(1-vinyl)ethyleneurea, N-vinyl-N-(1-aminoethyl)-ethyleneurea, N-(ethyleneureidoethyl)-4-pentenamide, N-(ethylenethioureido-ethyl)-10-undecenamide, butyl ethyleneureido-ethyl fumarate, methyl ethyleneureidoethyl fumarate, benzyl N-(ethyleneureido-ethyl)fumarate, benzyl N-(ethyleneureido-ethyl)maleamate, N-vinoxyethylethylene-urea, N-(ethyleneureidoethyl)-crotonamide, ureidopentyl vinyl ether, 2-ureidoethyl(meth)acrylate, N-2-(allylcarbamoto)aminoethyl imidazolidinone, 1-(2-((2-hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethylaminoethyl methacrylate, and ethylenically unsaturated monomers containing aziridine functionality. The at least one polymer particles may contain from 0.25% to 12.5%, by weight based on total monomer weight, of a copolymerized ethylenically-unsaturated aldehyde reactive group-containing monomer, based on the weight of the at least one polymer particles. In another example, the at least one polymer particles contain as polymerized units, from 0.25 wt. % to 12.5 wt. % of acetoacetoxyethyl (meth)acrylate as the aldehyde reactive group-containing monomer. The incorporation of the aldehyde reactive group-containing monomer as polymerized units into polymer particles is useful for providing dry coatings having enhanced adhesion to a substrate. In one embodiment, one or more of the soft polymer particles or the soft polymer phases contain the aldehyde reactive group-containing monomer as polymerized units.

In an alternative embodiment, the polymer particles contain a sufficient amount of copolymerized monomer(s) having select reactive functionality that is not reactive with aldehydes. During or after polymerization, the select reactive group is reacted to form aldehyde reactive groups. By "copolymerized aldehyde-reactive monomer equivalent" is meant herein the copolymerized monomer which leads to the polymer particles having aldehyde reactive groups even though the polymer particles were formed by a post-polymerization reaction rather than directly formed by the copolymerization of ethylenically-unsaturated aldehyde reactive group-containing monomer. In this embodiment, for example, the reaction product of polymers containing carboxylic acid functionality with compounds consisting of or containing an aziridine (ethyleneimine) ring or rings may be formed. Substitution on the ring may be on the nitrogen and/or either or both carbons such as, for example, ethyleneimine, propyleneimine, N-(2-hydroxyethyl) ethyleneimine, trimethylolpropane-tris-(β-(N-aziridinyl) propionate), and pentaerythritol trimethylolpropane-tris-(β-(N-aziridinyl) propionate). Also, polymers containing β-aminoester and/or β-hydroxyamide functionality may be formed by post-polymerization processes.

The polymer particles may optionally contain crosslinking groups that are capable of forming chemical bonds during and after drying of the aqueous polymer composition. Typically, the crosslinking groups are present in the polymer particles as polymerized ethylenically unsaturated monomers containing pendant crosslinking groups, referred to herein as "crosslinking monomers". Examples of crosslinking monomers include monomers having alkoxymethyl amide groups, such as, N-methylolacrylamide, N-methylolmethacrylamide, n-butoxymethyl acrylamide, n-butoxymethyl methacrylamide; monomers having acetoacetate groups; and monomers having epoxy groups. The crosslinking monomer may be present in one or more of the first polymer particles, one or more of the second polymer particles, or combinations thereof.

The aqueous polymer composition of this invention is prepared by admixing the first polymer particles, the pigment particles, and the optional second polymer particles.

In one process to prepare the aqueous polymer composition, an aqueous dispersion containing the first polymer particles containing absorbing groups selected from the phosphorus acid groups, phosphorus acid full-ester groups, polyacid sidechain group, or mixtures thereof, are admixed with a dispersion of the pigment particles and optionally dispersant. Next, the first polymer particles having absorbing groups are allowed sufficient time to attach to the pigment particles to form the composite particles. The attachment of the first polymer particles having the absorbing groups to the pigment particles is believed to occur by absorption and is also believed to be spontaneous and will continue until the occurrence of one of the following: the first polymer particles having absorbing groups are completely adsorbed to the surfaces of the pigment particles; the surfaces of the pigment particles are completely covered with the first polymer particles having absorbing groups; or an equilibrium is achieved between adsorbed first polymer particles having absorbing groups and first polymer particles having absorbing groups remaining dispersed in the aqueous medium. The time required for the completion of adsorption typically depends upon one or more of the following parameters: the pigment particle type, the surface treatment of the pigment particle, dispersant type and concentration, the concentrations of the pigment particles and the first polymer particles having absorbing groups, and temperature. The time required for the complete adsorption of the first polymer particles to the pigment particles varies from instantaneously upon admixing of the aqueous pigment particle dispersion and the aqueous first polymer particle dispersion to longer times, which are typically on the order of several hours in duration such as 6 to 12 hours, although still longer times of up to days or weeks may be required, depending on the above mentioned parameters. Mixing the aqueous medium containing the pigment particles and the first polymer particles having absorbing groups typically reduces the time for the completion of adsorption. For composite particles prepared with titanium dioxide particles as the pigment particles, adsorption of the first polymer particles having absorbing groups typically requires about 1 to about 12 hours for complete adsorption. Other optional components are permissible in the aqueous medium during the formation of the composite particle, provided these components do not substantially inhibit or substantially interfere with the adsorption of the first polymer particle having absorbing groups to the pigment particle. Examples of other components include co-solvents; wetting agents; defoamers; surfactants; biocides; other copolymers; and other pigments. Preferably the composite particle is formed in an aqueous medium in the absence of other co-polymers and other pigments. Optionally, the composite particle is prepared with levels of dispersant in the range of from 0 to 2 weight %, preferably from 0 to 1 weight %, and more preferably from 0 to 0.5 weight %, based on the weight of the pigment particle. Suitable dispersants include anionic polyelectrolyte dispersants such as co-polymerized maleic acid, co-polymers including co-polymerized acrylic acid, co-polymers including co-polymerized methacrylic acid, and the like; and carboxylic acids containing molecules such as tartaric acid, succinic acid, and citric acid. After formation of the composite particle, the second polymer particles are added, typically with mixing, to provide the aqueous polymer composition of this invention.

In another process, an aqueous polymer blend dispersion is formed by admixing the first polymer particles having absorbing groups and the second particles. Next, the aqueous polymer blend dispersion is admixed with a dispersion of the pigment particles and optionally dispersant to provide the aqueous polymer composition.

Alternatively, the composite particles containing the first polymer particles having absorbing groups is prepared by dispersing dry pigment particles into the an aqueous dispersion containing the first polymer particles having absorbing groups. Typically, high shear mixing is employed to disperse the pigment particles.

Mixing is typically provided to ensure that the pigment particles and the polymer particles having absorbing groups are distributed uniformly in the combined aqueous medium. It is preferred that the pigment particle dispersion is added to the aqueous dispersion containing the first polymer particles having absorbing groups, rather than vice versa, so that situations in which there is a temporary "excess" of pigment particles relative to the first polymer particles having absorbing groups, and the possibility of grit formation through bridging flocculation of the first polymer particles having absorbing groups due to the excess of pigment particles, are avoided.

In an alternative embodiment, the composite particle has a plurality of first polymer particles covalently bonded to the pigment particle, wherein the first polymer particles are indirectly attached to the pigment particle through a linkage that has a covalent bond with the surface of the pigment particle and a second covalent bond with the first polymer particle. The linkage is formed from a select coupling agent having a first functional group that reacts to form a first covalent bond with the surface of the pigment particle and a second functional group that reacts with the select functional group of the first polymer particle to form a second covalent bond. The pigment particle that is contained in this composite particle, has a surface containing a substance selected from metals, metal oxides, sulfides, salts, nonmetals, nonmetal sulfides, nonmetal oxides, and combinations thereof. The surface of the pigment particle is the native surface of the pigment particle or a surface having a surface treatment thereon, wherein the surface treatment provides a suitable surface for formation of covalent bonds. The first covalent bond is formed with an atom on or at the surface of the pigment particle, including any optional coating or surface treatment. In the presence of water, the surface of the pigment particle typically has hydroxyl groups. In this composite particle, the reacted coupling agents are covalently bonded to atoms on or at the surface of the pigment particle by bonds such as ether bonds, thiol ether bonds, or siloxane ether bonds. Suitable atoms on or at the surface of the pigment particle for forming the first covalent bond include Ti, Al, Zr, Si, Zn, Cr, Sn, Fe, C, and Pb. The first polymer particles are attached to the reacted coupling agents by second covalent bonds containing groups such as esters, amides, ethers, urethanes, thiol ethers, amines, or ureidos.

The composite particle having covalently bonded first polymer particles is formed by first admixing the pigment particle and a coupling agent. The coupling agent has a first functional group and a second functional group. The first functional group of the coupling agent reacts or is allowed to react with the pigment particle to form a modified pigment particle, in which the reacted first functional group of the coupling agent forms a first covalent bond with the pigment particle. Next, the modified pigment particle is admixed with the first polymer particles having a complementary functional group, and the second functional group of the coupling agent, which is covalently bonded to the pigment particle, and the complementary functional groups of the first polymer particle react or are allowed to react to form the composite particle having covalently bonded first polymer particles. The reaction of the second functional group of the coupling agent and the complementary functional group of the first polymer particle similarly forms a second covalent bond. In this embodiment, the first polymer particles are attached to the surface of the pigment particle by linkages, which are molecular chains forming first covalent bonds with the surface of the pigment particle and second covalent bonds with the first polymer particles. The linkages are formed by the reacted coupling agents.

The coupling agent typically has a molecular weight of less than 10,000, preferably less than 1,000, and most preferably less than 500. The reacted coupling agent has a reacted first functional group that forms a first covalent bond with the pigment particle and has a reacted second functional group that forms a second covalent bond with the first polymer particle. Alternatively, the coupling agent contains more than one first functional group, provided that the coupling agent is bonded to only one pigment particle. Alternatively, the coupling agent also contains more than one second functional group. For example, a coupling agent such as 3-aminopropyl-trimethoxysilane has three trimethoxysilane groups as the first functional groups. This coupling agent is capable of forming one, two, or three covalent bonds with the pigment particle. Similarly, the coupling agent alternatively contains more than one second functional group and is capable of alternatively forming more than one covalent bond with a single first polymer particle, or forming multiple individual covalent bonds with two or more first polymer particles. Suitable levels of coupling agent to form the composite particle include levels of from 0.1 to 50 equivalents of the second function group for each equivalent of complementary functional group of the first polymer particle.

Suitable first functional groups for attaching the coupling agent to the pigment particle include alkoxysilanes, acyloxysilanes, halosilanes, and silanols.

Second functional groups suitable for reaction with the complementary functional groups of the first polymer particle include, for example, isocyanates and isothiocyanates, which react with a complementary functional group selected from alcohols, amines, ureas, and anhydrides; aldehyde groups, which react with a complementary functional group selected from acetoacetoxy groups and amines; acetoacetoxy groups, which react with a complementary functional group selected from aldehydes and amines; epoxides, thioranes, and aziridines, which react with a complementary functional group selected from alcohols, carboxylic acids, anhydrides, amines, and mercaptans; carbodiimides, which react with a complementary functional group selected from carboxylic acids, alcohols, amines, and mercaptans; haloalkane and halomethylphenyl groups, which react with a complementary functional group selected from amines and carboxylic acids; amines and thiols, which react with a complementary functional group selected from epoxides, aziridines, thioranes, acetoacetoxy groups, isocyanates, isothiocyanates, and carbodiimides; and carboxylic acids, which react with a complementary functional group selected from epoxides, aziridines, thioranes, and carbodiimides.

Examples of suitable coupling agents include: aminosilanes, such as 4-aminobutylmethyldiethoxysilane, 3-aminopropyltrimethoxysilane, and N-(2-aminoethyl)-3-aminopropyldiethylisopropoxysilane; haloalkylsilanes, such as 3-chloropropyltrimethoxysilane, 4-bromobutylmethyldibutoxysilane, and 5-iodohexyldiethylmethoxysilane; (meth) acrylosilanes, such as 3-methacryloxypropyldimethylethoxysilane and 3-acryloxypropyltrimethoxysilane; alcohol-functional silanes, such as 3-hydroxybutylisopropyldimethoxysilane, bis(2-hydroxyethyl)-3-aminopropyltriethoxysilane; epoxysilanes, such as (3-glycidoxypropyl)methyldimethoxysilane and 2-(3,4-epoxycyclohexyl) ethyltrimethoxysilane; iso(thio)cyanatosilanes, such as 3-isocyanatopropyltrimethoxysilane and 3-isothiocyanatopropylmethyldimethoxysilane; mercaptosilanes, such as (mercaptomethyl)dimethylethoxysilane, di-4-mercaptobutyldimethoxysilane, and 3-mercaptopropyltriisopropoxysilane; (propyltrimethoxysilane)sulfide terminated poly (hydroxyethylacrylate); halophenylsilanes, such as bromophenyltrimethoxysilane and (2-(iodophenyl)ethyl) ethyldimethoxysilane; halomethylphenylsilanes, such as bis (chloromethylphenyl)dimethoxysilane and bromomethylphenyldimethylisopropoxysilane; carbodiimidesilanes, such as bis(propyltrimethoxysilane)carbodiimide and N-ethyl-N'-(propylethoxydimethoxysilane)-carbodiimide; aldehyde-functional silanes, such as 3-(trimethoxysilyl)propanal and (propyltrimethoxysilane)sulfide terminated methylmethacrylate-acrolein copolymer; and 1,3-diketone functional silanes, such as (3,5-hexandione)triethoxysilane, 3-(trimethoxysilyl)propyl acetoacetate, and (butyltriethoxysilane)sulfide terminated methylmethacrylate-butyl acrylate-acetoacetoxyethyl methacrylate copolymer.

Any one of the group of reactions including the reaction between the first functional group and the pigment particle; and the reaction between the second functional group and the complementary functional group of the first polymer particle, is optionally conducted in the presence of a catalyst. For example, tertiary amines and tin salts are suitable catalysts for the reaction between an isocyanate group as the second functional group and an alcohol as the complementary functional group. The extent of reaction of the first functional group, the second functional group, and the complementary functional group is determined using conventional analytical techniques such as infrared spectroscopy, nuclear magnetic resonance spectroscopy, and ultraviolet-visible spectroscopy.

One process to prepare the composite particle having covalently bonded polymer particles includes the steps of admixing the pigment particle and the coupling agent; forming the modified pigment particle by reacting or allowing to react the pigment particle and the first functional group of the coupling agent; admixing the modified pigment particle into an aqueous dispersion containing the first polymer particle having a complementary functional group; and forming the composite particle having covalently bonded first polymer particles by reacting or allowing to react the second functional group of the reacted coupling agent, which is covalently bonded to the surface of the pigment particle, with the complementary functional group of the polymer particle. The modified pigment particle is admixed and dispersed into the aqueous dispersion containing the first polymer particle having a complementary functional group as a dry material. Alternatively, the modified pigment particle is provided as an aqueous dispersion and admixed with the aqueous dispersion containing the first polymer particle having a complementary functional group.

The composite particles contained in the aqueous polymer composition typically have weight ratios of the plurality of first polymer particles that are attached to the pigment particle to the pigment particles in the range of from 0.2 to 1.4, preferably in the range of from 0.3 to 1, and more preferably, in the range of from 0.4 to 0.7.

Additionally, the aqueous polymer composition may contain crosslinking agents. These crosslinking groups are coreactive with optional functional groups on the first or second polymer particles, such as amine groups, keto groups, aldehyde groups, acetoacetoxy groups, cyanoacetoxy groups, hydroxy groups, epoxy groups, and acid groups. The type of crosslinking agent and the level of crosslinking agent are chosen such that the ability of the aqueous polymer composition to form a film is not materially affected. Suitable crosslinking agents include, for example, multifunctional amine compounds, oligomers, and polymers that have at least two amine groups such as hexamethylene diamine, ethylenediamine, 1,2-diaminopropane, 2-methyl-1,5-pentane diamine, 1,4-diaminobutane, 1,12-diaminododecane, 1,2-diaminocylcohexane, 1,2-phenyldiamine, diaminotoluene, polyethylene imine, difunctional and trifunctional Jeffamines™ curing agents (Huntsman Petrochemical Corporation), and aqueous polyurethane dispersions with pendant amino, hydrazide or hydrazine groups; aminosilane epoxy silanes such as 3-aminopropyltrimethoxysilane, 3-aminopropyltriethoxysilane, 3-aminopropylmethyldimethoxysilane, 3-aminopropylmethyldiethoxysilane, 3-aminopropyltriisopropoxysilane, 3-aminopropylmethyldiisopropoxysilane, 3-aminopropylmethyldiisopropoxysilane, 3-aminopropyltriisopropoxysilane, N-2-aminoethyl-3-aminopropyltrimethoxysilane, N-2-aminoethyl-3-aminopropyltriethoxysilane, N-2-aminoethyl-3-aminopropylmethyldimethoxysilane, N-2-aminoethyl-3-aminopropylmethyldiethoxysilane, N-2-aminoethyl-3-aminopropyltriisopropoxysilane, N-2-aminoethyl-3-aminopropyltriisopropoxysilane, N-2-aminoethyl-3-aminopropylmethyldiisopropoxysilane, and N-2-aminoethyl-3-aminopropylmethyldiisopropoxysilane; epoxy silanes such as glycidoxypropyltrimethoxysilane, glycidoxypropylmethyldimethoxysilane, glycidoxypropyltriethoxysilane, glycidoxypropylmethyldiethoxysilane, or beta-(3,4-epoxycyclohexyl)ethyltriethoxysilane; multifunctional isocyanates such as Bayhydur™ XP-7063 isocyanate (Bayer); aliphatic carbodiimides such as Ucarlink™ XL-29SE crosslinker, or those disclosed in U.S. Pat. No. 4,977,219; aromatic carbodiimides such as disclosed in U.S. Pat. No. 5,574,083; divalent metal ions such as $Zn^{2+}$, $Mg^{2+}$, $Ca^{2+}$; and zirconates such as ammonium zirconium carbonate. Preferably, the multifunctional amine compounds employed as crosslinking agents in the aqueous polymer composition are primary amine groups. Preferred levels for the multifunctional amine compounds with primary amine groups in the polymer composition is a ratio of 0.1 to 1 primary amine groups per coreactive group. Preferred aminosilanes include N-2-aminoethyl-3-aminopropylmethyldimethoxysilane, N-2-aminoethyl-3-aminopropyltrimethoxysilane, and 3-aminopropylmethyldimethoxysilane.

Optionally the aqueous polymer composition contains pigment at pigment volume concentrations in the range of 0 to 85%, preferably in the range of 0 to 45%, and more preferably in the range of 0 to 25%. The pigment volume concentration of the pigment particles is the percentage of the volume occupied by the pigment particles, based on the total volume of the dried coating prepared from the aqueous polymer composition. Suitable pigments include inorganic pigments, organic pigments, and fillers such as titanium dioxide, iron oxide, zinc oxide, magnesium silicate, calcium carbonate, organic and inorganic colored pigments, aluminosilicates, silica, and various clays. Suitable organic pigments also include plastic pigments such as solid bead pigments and microsphere pigments containing voids or vesicles, and inorganic pigments. Examples of solid bead pigments include polystyrene and polyvinyl chloride beads. Examples of microsphere pigments, which include polymer particles containing one or more voids and vesiculated polymer particles, are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; an U.S. Pat. No. 5,510,422. Other suitable pigments include, for example, Expancel™ 551 DE20 acrylonitrile/vinyl chloride expanded particles (Expancel Inc. Duluth Ga.); Sil-Cell™ 35/34 a sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Sphere W-1200 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.).

The aqueous polymer composition optionally contains extender particles, which are inorganic particles that are not pigment particles. Examples of extender particles include calcium carbonate particles and clay particles. A suitable range for the amount of extender particles included in the aqueous polymer composition is from 0 to 70 volume %, based on the volume of the aqueous polymer composition. Typically, the aqueous polymer composition of this invention, when used to prepare opaque dried coatings, has a solids level in the range of from 20 to 50 volume %, based on the volume of the aqueous polymer composition.

The pH of the aqueous polymer composition is typically in the range of from 3 to 11, and preferably, in the range of from 7 to 10. A suitable viscosity range for the aqueous polymer composition is from 50 to 130 Kreb units (KU), preferably from 70 to 110 KU, and more preferably from 90 to 100 KU.

The aqueous polymer composition optionally contains coalescents or plasticizers to lower the effective film formation temperatures of the soft polymer. The level of optional coalescent is in the range of from 1 weight % to 40 weight %, based on the weight of the total polymer solids. The polymer solids is the total weight of hard polymer and soft polymer in the aqueous polymer composition. In addition, the aqueous polymer composition optionally includes other components, including without limitation, other polymers, surfactants, other pigments, other extenders, dyes, pearlescents, adhesion promoters, crosslinkers, dispersants, defoamers, leveling agents, optical brighteners, ultraviolet stabilizers, rheology modifiers, preservatives, biocides, and antioxidants.

In one further embodiment, the aqueous polymer composition of this invention contains a photosensitive moiety. The photosensitive moiety is capable of absorbing some portion of the solar light spectrum. The photosensitive moiety may be a photosensitive compound added to the aqueous polymer composition, or a photosensitive group that is chemically incorporated into one or more of the polymer particles contained in the aqueous polymer composition, for example, by copolymerization. Examples of photosensitive compounds are benzophenone derivatives wherein one or both of the phenyl rings may be substituted such as, for example, benzophenone, 4-methyl benzophenone, 4-hydroxy benzophenone, 4-amino benzophenone, 4-chloro benzophenone, 4-hydroxycarboxyl benzophenone, 4,4'-dimethyl benzophenone, 4,4'-dichloro benzophenone, 4-carboxymethyl benzophenone, 3-nitro benzophenone, substituted phenyl ketones such as substituted phenyl acetophenones. Benzophenone is preferred. The aqueous polymer composition may contain from 0.1 to 5 weight %, preferably from 0.1 to 3 wt. %, and more preferably, 0.1 to 1 weight % of one or more photosensitive compounds, based on the total polymer weight. The photosensitive groups may be present in one or more of the polymer particles as copolymerized ethylenically unsaturated monomers that contain photosensitive groups. Examples of ethylenically unsaturated monomers that contain photosensitive groups include vinyl toluene, allyl benzoylbenxoates and monomers incorporating pendant benzophenone groups, such as vinylbenzyl methylbenzoylbenzoate, hydroxymethacryloxypropyl methylbenzoylbenzoate, hydroxymethacryloxypropyl benzoylbenzoate, and hydroxymethacryloxypropoxy benzophenone. Vinyl toluene is preferred. The polymer particles may contain from 0.1 to 10 weight %, preferably from 0.1 to 5 weight %, and more preferably from 0.5 to 2 weight % of the ethylenically unsaturated monomer containing a photosensitive group. The copolymerized monomer containing a photosensitive group may be present in one or more of the first polymer particles, one or more of the second polymer particles, or combinations thereof.

A volatile organic compound ("VOC") is defined herein as a carbon containing compound that has a boiling point below 280° C. at atmospheric pressure. Compounds such as water and ammonia are excluded from VOCs.

The aqueous polymer composition of this invention contains less than 5% VOC by weight based on the total weight of the aqueous polymer composition; preferably the aqueous polymer composition contains less than 3% VOC by weight based on the total weight of the aqueous polymer composition; more preferably the aqueous polymer composition contains less than 1.7% VOC by weight based on the total weight of the aqueous polymer composition. A "low VOC" aqueous polymer composition herein is an aqueous polymer composition that contains less than 5% VOC by weight based on the total weight of the aqueous polymer composition; preferably it contains between 0.01% and 1.7% by weight based on the total weight of the aqueous polymer composition.

Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons. It is preferred that the aqueous polymer blend composition contains less than 5% by weight based on the total weight of the aqueous polymer blend composition of the added VOCs and more preferably less than 1.7% by weight based on the total weight of the aqueous polymer blend composition of the added VOCs.

Additionally, the low VOC aqueous polymer composition optionally contains coalescing agents that are not VOCs. A coalescing agent is a compound that is added to a water-borne emulsion polymer, paint, or coating, which reduces the minimum film forming temperature (MFFT) of the emulsion polymer, paint or coating by at least 1° C. The MFFT is measured using ASTM test method D2354. Examples of coalescing agents that are not VOCs include plasticizers, low molecular weight polymers, surfactants, and autooxidizable plasticizers such as alkyl esters of unsaturated fatty acids. Preferred are alkyl esters prepared from oils such as linseed, tung, dehydrated castor, soybean, tall, sunflower, and corn. Examples of non-VOC coalescing agents include esters of unsaturated fatty acids, such as mono, di-, or tri-unsaturated fatty acids. Suitable unsaturated fatty acid esters include monounsaturated fatty acid esters formed from palmitoleic acid, oleic acid, or caproleic acid; diunsaturated fatty acid esters formed from linoleic acid; triunsaturated fatty acid esters formed from linolenic acid or eleosteric acid, or mixtures thereof. Suitable esters of unsaturated fatty acids includes alkyl esters such as, such as methyl and ethyl esters; substituted alkyl esters, such as esters formed from ethylene glycol and propylene glycol; and alkyl ether esters of unsaturated fatty acids, diethylene glycol, triethylene glycol, dipropylene glycol, tripropylene glycol, and diethylene glycol monobutyl ether. In one embodiment, the above auto autooxidizable plasticizers are used in conjunction with soft polymer latex polymer particles which contain 0.25% to 12.5% of acetoacetoxyethyl (meth)acrylate as polymerized units. Auto oxidation can further be enhanced by the use of metal ion catalysts such as cobalt, zirconium, calcium, manganese, copper, zinc and iron. Simple salts such as halides, nitrates, and sulfates maybe used but in many cases an organic anion such as the acetate, naphthenate or acetoacetonate is used. That is, a non-VOC coalescing agent is a coalescing agent which has a boiling point above 280° C. at atmospheric pressure.

Typical methods of paint or coating preparation introduce adventitious VOCs from the aqueous polymer composition containing the polymer particles having pendant crosslinking groups, biocides, defoamers, soaps, dispersants, and thickeners. These typically account for 0.1% VOC by weight based on the total weight of the aqueous polymer composition. Additional methods such as steam stripping and choice of low VOC containing additives like biocides, defoamers, soaps, dispersants, and thickeners are suitable for further reducing the aqueous polymer composition to less than 0.01% VOC by weight based on the total weight of the aqueous polymer composition.

Conventional coatings application methods such as, for example, brushing, rolling, and spraying methods such as, for example, air-atomized spray, air-assisted spray, airless spray, high volume low pressure spray, and air-assisted airless spray may be used to apply the aqueous polymer composition of this invention. Additionally, for some systems, other application techniques may be used to apply the aqueous polymer composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, composites, and cementitious substrates. Drying is typically allowed to proceed under ambient conditions such as, for example, at 0° C. to 35° C. but may be accelerated with heat or low humidity.

A method of forming a coated substrate from the aqueous polymer composition of this invention includes: providing the aqueous polymer composition; applying the aqueous polymer composition onto a substrate; drying or allowing to dry the aqueous polymer composition that was applied onto the substrate to prepare a dry coating to provide the coated substrate.

The aqueous polymer composition may be applied on a substrate using various techniques including, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the applied aqueous polymer composition may be in the range of 1 micron to 250 microns. The aqueous polymer composition is applied onto a substrate as a single coat or multiple coats. After application, the applied aqueous polymer composition is typically allowed to dry at ambient conditions or alternatively dried by the application of heat to provide a dry coating. Drying is typically allowed to proceed under ambient conditions such as, for example, at 0° C. to 35° C.

The aqueous polymer composition is suitable for application onto various substrates including processed timber such as medium density fiber board, chip board, laminates; mineral substrates such as masonry, cement, fiber cement, cement asbestos, plaster, plasterboard, glazed and unglazed ceramic; metal substrates such as galvanized iron, galvanized steel, cold rolled steel, Zincalum metal, Zincalum II metal, aluminum, wrought iron, drop forged steel, stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

The dry coating prepared from the aqueous polymer composition is suitable as a protective coating or an aesthetic coating. Examples of suitable coatings include architectural coatings such as interior and exterior paint coatings, including masonry coatings, wood coating and treatments; floor polishes; maintenance coatings such as metal coatings; paper coatings; and traffic coatings such as those coatings used to provide markings on roads, pavements, and runways.

The following examples are presented to illustrate the composition and the process of the invention. These examples are intended to aid those skilled in the art in understanding the present invention. The present invention is, however, in no way limited thereby.

The following abbreviations are used in the examples:

| | |
|---|---|
| AA | acrylic acid |
| APS | ammonium persulfate |
| BA | butyl acrylate |
| MAA | methacrylic acid |
| MMA | methyl methacrylate |
| PEM | 2-phosphoethyl methacrylate (85 wt. % in MMA) |
| SLS | sodium lauryl sulfate (28 wt. %) |
| surfactant-A | lauryl-(ethylene oxide)$_4$ sodium sulfate (30 wt. %) |
| $T_g$ | glass transition temperature |
| UMA | ureido methacrylate (50 wt. % in water) |

EXAMPLE 1

Preparation of First Polymer Particles

Aqueous dispersions containing the first polymer particles are prepared in a 5-liter, four-necked round bottom flask equipped with a paddle stirrer, a thermometer, a nitrogen inlet, and a reflux condenser.

EXAMPLE 1.1

Preparation of First Hard Polymer Particles

To the flask is added 1360 grams (g) of deionized water and 5.4 g of concentrated sulfuric acid. The contents of the flask is heated to 85° C. under a nitrogen atmosphere. The pH of the water in the flask is approximately 1. A monomer emulsion (ME-1), which is prepared by mixing 38.4 g deionized water, 12.8 g of surfactant-A, 25.6 g BA, and 89.6 g MMA, is added to the flask. Next, a solution containing 7.7 g sodium persulfate in 60 g deionized water is added. After the contents of the flask is maintained at 85° C. for 10 minutes, a second monomer emulsion (ME-2), which is prepared by mixing 512 g deionized water, 51.2 g surfactant-A, 396.8 g BA, 1321.0 g MMA, 19.2 g AA, and 67.8 g PEM, is added to the flask at a rate of 24 grams/minute while maintaining the contents of the flask at a temperature of 85° C. After the complete addition of ME-2, the contents of the flask is maintained at a temperature of 85° C. for 10 minutes, and then cooled to room temperature. Next, a solution containing 50 g ammonium hydroxide (28%) in 50 g deionized water is added and the contents of the flask is filtered to remove any coagulum. The resulting aqueous dispersion, Example 1.1, has a solids content of 46.6 wt. % and a pH of 8.8. The $T_g$ of the first hard polymer particles is 46° C. The first hard polymer particles of Example 1.1 have an average particle diameter of 134 nm and contain phosphorus acid groups as the pendant group.

EXAMPLE 1.2

Preparation of First Soft Polymer Particles

An aqueous dispersion containing first soft polymer particles is prepared according to the general procedure for Example 1.1, except that ME-2 is prepared by mixing 512 g deionized water, 51.2 g surfactant-A, 1068.8 g BA, 666.1 g MMA, 33.6 g of MAA, 2.4 g 1-dodecanethiol, and 33.9 g PEM.

The resulting aqueous dispersion, Example 1.2, has a solids content of 45.2 wt. % and a pH of 9. The $T_g$ of the first soft polymer particles is −7° C. The first soft polymer particles of Example 1.2 have an average particle diameter of 124 nm and contain phosphorus acid groups as the pendant group.

EXAMPLE 1.3

Preparation of First Soft Polymer Particles

To the flask is added 1360 g deionized water and 5.4 g concentrated sulfuric acid. The contents of the flask is heated to 75° C. under a nitrogen atmosphere. The pH of the water in the flask is approximately 1. A monomer emulsion (ME-1), which is prepared by mixing 38.4 g deionized water, 12.8 g of surfactant-A, 25.6 g BA, and 89.6 g MMA, is added to the flask. Next, a first solution containing 3.0 g APS in 30 g deionized water, and a second solution containing 0.02 g ferrous sulfate in 20 g deionized water, and a third solution containing 1.5 g sodium hydrosulfite in 15 g deionized water are added to the flask. Next, the contents of the flask is maintained at 75° C. for 10 minutes. A second monomer emulsion (ME-2), which is prepared by mixing 512 g deionized water, 51.2 g surfactant-A, 1068.8 g BA, 666.1 g MMA, 33.6 g MAA, 2.4 g dodecanethiol, and 33.9 g PEM, is added at a rate of 24 grams/minute along with a separate first cofeed of a solution of 2.4 g APS in 90 g deionized water, and separate second cofeed of a solution of 1.2 g isoascorbic acid in 90 g deionized water. The contents of the flask is maintained at 75° C. during the addition of ME-2 and the two cofeed solutions. Upon the complete additions of ME-2 and the two cofeed solutions, the contents of the flask is maintained at a temperature of 75° C. for 10 minutes, and then cooled to room temperature. Next, a solution containing 50 g ammonium hydroxide (28%) and 50 g deionized water is added and the contents of the flask is filtered to remove any coagulum. The resulting aqueous dispersion, Example 1.3, has a solids content of 44 wt. % and a pH of 8.8. The $T_g$ of the first soft polymer particles is −7° C. The first soft polymer particles of Example 1.3 have an average particle diameter of 124 nm and contain phosphorus acid groups as the pendant group.

EXAMPLE 1.4

Preparation of First Hard-Soft Polymer Particles

To the flask is added 1400 g deionized water and 5.6 g concentrated sulfuric acid. The contents of the flask is heated to 75° C. under a nitrogen atmosphere. The pH of the water in the flask is approximately 1. A monomer emulsion (ME-1), which is prepared by mixing 45 g deionized water, 9.0 g of surfactant-A, 36.2 g BA, 83.7 g MMA, 1.35 g allyl methacrylate, 5.4 g MAA, and 8.0 g PEM, is added to the flask. Next, a first solution containing 3.0 g APS in 30 g deionized water, a second solution containing 0.02 g ferrous sulfate in 20 g deionized water, and a third solution containing 1.5 g sodium hydrosulfite in 15 g deionized water are added to the flask. After the contents of the flask is maintained at 75° C. for 10 minutes, 9.5 g ammonium hydroxide (28%) is added to the flask to adjust the pH to 2-3. A second monomer emulsion (ME-2), which is prepared by mixing 300 g deionized water, 50.9 g sodium dodecyl benzene sulfonate (23 wt. %), 736.3 g BA, 460.5 g MMA, 18.2 g MAA, and 24.3 g UMA (50 wt. % in water), is added to the flask at a rate of 15 grams/minute along with a separate first cofeed of a solution containing 2.4 g APS in 90 g deionized water, and a separate second cofeed of a solution containing 1.2 g isoascorbic acid in 90 g deionized water, while maintaining the contents of the flask at a temperature of 75° C. Upon the complete additions of ME-2 and the two cofeed solutions, the contents of the flask is maintained at a temperature of 75° C. for 15 minutes, and then cooled to room temperature. Next, 18 g ammonium hydroxide (28%) is added to the flask and the contents of the flask is filtered to remove any coagulum. The resulting aqueous dispersion, Example 1.4, has a solids content of 37.8 wt. % and a pH of 8.8. Example 1.4 contains first hard-soft polymer particles having 10 wt. % first hard polymer phase with a $T_g$ of 32° C., and 90 wt. % first soft polymer phase with a $T_g$ of −9° C. The first hard polymer phase of the hard-soft polymers contains phosphorus acid groups as the pendant group. The first hard-soft polymer particles of Example 1.4 have an average particle diameter of 140 nm.

EXAMPLE 1.5

Preparation of First Hard-Soft Polymer Particles

An aqueous dispersion containing first hard-soft polymer particles is prepared according to the general procedure for Example 1.4, except that ME-2 is prepared by mixing 300 g deionized water, 50.9 g sodium dodecyl benzene sulfonate (23 wt. %), 692.5 g BA, 499.7 g MMA, 21.3 g MAA, 1.5 g 1-dodecanethiol, and 24.3 g UMA (50 wt. % in water).

The resulting aqueous dispersion, Example 1.5, has a solids content of 38 wt. % and a pH of 8.8. Example 1.5 contains first hard-soft polymer particles having 10 wt. % first hard polymer phase with a $T_g$ of 32° C., and 90 wt. % first soft polymer phase with a $T_g$ of −4° C. The first hard polymer phase of the hard-soft polymers contains phosphorus acid groups as the pendant group. The first hard-soft polymer particles of Example 1.5 have an average particle diameter of 125 nm.

EXAMPLE 1.6

Preparation of First Hard Polymer Particles

To the flask is added 800 g of deionized water and 3.0 g concentrated sulfuric acid. The contents of the flask is heated to 85° C. under a nitrogen atmosphere. The pH of the water in the flask is approximately 1. A monomer emulsion (ME-1), which is prepared by mixing 22 g deionized water, 4.0 g of surfactant-A, 8.0 g BA, and 28.0 g MMA, is added to the flask. Next, a solution containing 2.4 g sodium persulfate in 20 g deionized water is added. After the contents of the flask is maintained at 85° C. for 10 minutes, a second monomer emulsion (ME-2), which is prepared by mixing 140 g deionized water, 16.0 g surfactant-A, 132.0 g BA, 459.0 g MMA, 30.8 g of a terminally unsaturated acrylic acid macromonomer with an average molecular weight of 1,100, is added to the flask at a rate of 7.5 grams/minute while maintaining the contents of the flask at a temperature of 85° C. After the complete addition of ME-2, the contents of the flask is maintained at a temperature of 85° C. for 15 minutes, and then cooled to room temperature. Next, 16 g ammonium hydroxide (28%) is added and the contents of the flask is filtered to remove any coagulum. The resulting aqueous dispersion, Example 1.6, has a solids content of 36 wt. % and a pH of 9. The $T_g$ of the first hard polymer particles is 54° C. The first hard polymer particles of Example 1.6 have an average particle diameter of 121 nm and contain polyacid sidechain groups as the pendant group.

EXAMPLE 2

Preparation of Second Polymer Particles

Aqueous dispersions containing the second polymer particles are prepared using the apparatus described in Example 1.

EXAMPLE 2.1

Preparation of Second Hard Polymer Particles

To the flask are added 1482 g deionized water and 32.8 g sodium lauryl sulfate. The contents of the flask is heated to 85° C. under a nitrogen atmosphere. A solution containing 5.7 g sodium carbonate in 56 g deionized water is added to the flask. Next, 102 g of a monomer emulsion, which contains 413 g deionized water, 16.4 g sodium lauryl sulfate, 495.6 g BA, 1285.0 g MMA, and 36.7 g MAA, is added to the flask. To the remaining monomer emulsion, 36.7 g UMA is added. The remaining monomer emulsion is added to the flask over a period of 90 minutes, while contents of the flask is maintained at a temperature in the range of 83-85° C. After the complete addition of the monomer emulsion, the flask contents is maintained at temperature of 85° C. for 10 minutes and then cooled to 65° C. After cooling the contents of the flask to 45° C., 16.0 g ammonium hydroxide (29% active) is added and diluted with DI water.

The resulting aqueous dispersion, Example 2.1, has a solids content of 45.9 wt. % and a pH of 8. The $T_g$ of the second hard polymer particles is 43° C. The second hard polymer particles of Example 2.1 have an average particle diameter of 102 nm and do not contain phosphorus acid groups, phosphorus acid full-ester groups, or polyacid sidechain groups.

EXAMPLE 2.2

Preparation of Second Soft Polymer Particles

To the flask are added 1000 g deionized water and 2.5 g Triton™ XN-45S surfactant (Triton is a trademark of Dow Chemical Co.). The contents of the flask is heated to 85° C. under a nitrogen atmosphere. Next, 92 g of a monomer emulsion, which contains 969 g BA, 34 g MAA, 680 g MMA, 460 g deionized water, and 18.7 g Triton™ XN-45S surfactant, is added, along with the separate additions of a first solution containing 2.6 g APS in 100 g deionized water and a second solution containing 1.7 g sodium carbonate in 100 g deionized water. To the remaining monomer emulsion, 34 g UMA (50 wt. % solution in water) is added. The remaining monomer emulsion is added to the flask over a period of 210 minutes, while contents of the flask is maintained at a temperature in the range of 83-85° C. After the complete addition of the monomer emulsion, the emulsion addition line is washed with 60 g deionized water, with the rinse water being added to the flask. The flask contents are cooled to 65° C. After cooling the contents of the flask to 45° C., 16.0 g ammonium hydroxide (29% active) is added and diluted with DI water. The contents of the flask are neutralized with ammonium hydroxide (29%) to a pH in the range of 9-10.

The resulting aqueous dispersion, Example 2.2, has a solids content of 46.7 wt. % and a pH of 8. The second soft polymer particles of Example 2.2 have a $T_g$ of –6° C., an average particle diameter of 147 nm, and do not contain phosphorus acid groups, phosphorus acid full-ester groups, or polyacid sidechain groups.

EXAMPLE 2.3

Preparation of Second Soft Polymer Particles

To the flask are added 380 g deionized water and 5.2 g sodium lauryl sulfate. The contents of the flask is heated to 65° C. under a nitrogen atmosphere. Next, 35 g of a monomer emulsion, which contains 600 g BA, 20 g MAA, 365 g MMA, 1.25 g nDDM, 400 g deionized water, 6.9 g sodium carbonate, and 30.5 g SLS, is added to the flask, followed by the addition of a solution of 0.02 g ferrous sulfate heptahydrate and 0.02 g tetrasodium salt of ethylenediamine-tetraacetic acid in 15.6 g deionized water. Next, a solution containing 0.54 g APS in 8 g deionized water is added followed by the addition of a solution containing 0.27 g sodium hydrosulfite in 8 g deionized water. To the remaining monomer emulsion, 30 g UMA (50 wt. % in water) is added. The remaining monomer emulsion is added to the flask alone with the separate coadditions of a solution containing 2.9 g APS in 50 g deionized water and a solution of 1 g of D-isoascorbic acid in 50 g deionized water. The monomer emulsion and the two coadditions are added over a period of approximately 95 minutes, while maintaining the contents of the flask at a temperature of approximately 65° C. After the complete addition of the monomer emulsion, the emulsion feed line is rinsed with 20 g deionized water, which is then added the flask. The contents of the flask is cooled to 60° C. and neutralized with ammonium hydroxide to a pH in the range of 9-10.

The % conversion of the monomer in the reaction mixture during the addition of the monomer emulsion is shown in Table 2.1.

TABLE 2.1

% Conversion of Monomer in the Polymerization of Example 2.3

| weight % of monomer feed | weight % polymer formed | weight % unreacted added monomer |
|---|---|---|
| 20 | 86.2 | 13.8 |
| 40 | 88.3 | 11.7 |
| 60 | 89.5 | 10.5 |
| 80 | 90.8 | 9.2 |
| 90 | 92.5 | 7.5 |
| 100 | 90.6 | 9.4 |

The resulting aqueous dispersion, Example 2.3, has a solids content of 49.2 wt. %. The second soft polymer particles of Example 2.3 have an average particle diameter of 187 nm, a $T_g$ of –10° C., and do not contain phosphorus acid groups, phosphorus acid full-ester groups, or polyacid sidechain groups. Example 2.3 is prepared by a polymerization process wherein at least 40% of the weight of the second soft polymer particles are prepared by a redox polymerization. Further, the second soft polymer particles of Example 2.3 are formed in a process wherein at least 40 weight % of each of the second soft polymer particles are polymerization in the presence of excess unreacted monomer.

EXAMPLE 2.4

Preparation of Second Soft Polymer Particles

To the flask are added 215 g deionized water and 5.2 g SLS. The contents of the flask ware heated to 88° C. under a nitrogen atmosphere. Next 35 g of a monomer emulsion, which contains 410 g MMA, 570 g BA, 20 g MAA, 1.25 g nDDM, 455 g deionized water, and 30.5 g SLS, is added along with a solution containing 0.35 g sodium carbonate and 0.3 g APS in 20 g deionized water. The remaining monomer emulsion is added to the flask along with the concurrent addition of a solution containing 1.05 g APS and 6.55 g sodium carbonate in 50 g DI water, over a period of approximately 95 minutes, while maintaining contents of the flask at a temperature of 88° C. After the complete addition of the monomer emulsion and the initiator solution, the emulsion feed line is rinsed with 20 g deionized water, which is added to the flask. Next, the contents of the flask are cooled to 60° C. The contents of the flask is neutralized with ammonium hydroxide to a pH in the range of 9-10.

The % conversion of the monomer in the reaction mixture during the addition of the monomer emulsion is shown in Table 2.2.

TABLE 2.2

% Conversion of Monomer in the Polymerization of Example 2.4

| weight % of monomer feed | weight % polymer formed | weight % unreacted added monomer |
|---|---|---|
| 20 | 88 | 12 |
| 40 | 87 | 13 |
| 60 | 89 | 11 |
| 80 | 91 | 9 |
| 90 | 92 | 8 |
| 100 | 93 | 7 |

The resulting aqueous dispersion, Example 2.4, has a solids content of 50.2 wt. %. The second soft polymer particles of Example 2.4 have an average particle diameter of 169 nm, a $T_g$ of −5° C., and do not contain phosphorus acid groups, phosphorus acid full-ester groups, or polyacid sidechain groups.

EXAMPLE 3

Preparation of Aqueous Polymer Compositions

Examples are prepared of the aqueous polymer composition of this invention.

Preparation of Titanium Dioxide Particle Dispersion

A mixture of 133.0 g of water, 8.9 g of Tamol™ 731A dispersant (Tamol is a trademark of Rohm and Haas Company), 10 g of Colloid™ 643 dispersant (Colloid is a trademark of Allied Colloids Limited Company, UK), and 5 g of 28% $NH_3$ is placed in grind pot. The contents of the grind pot are mixed on a Premier Mill dispersator equipped with a disk blade. To the grind pot, 553.5 g of TiPure™ R-706 titanium dioxide (TiPure is a trademark of E. I. DuPont de Nemours and Company) is added to the pot and is ground at 2000 rpm for 20 minutes to prepare a titanium dioxide particle dispersion. The resulting titanium dioxide particle dispersion contains 77.9 percent by weight of titanium dioxide based on the total weight of the titanium dioxide particle dispersion

EXAMPLE 3.1

Preparation of Aqueous Polymer Composition Containing First Hard Polymer Particles and Second Soft Polymer Particles An aqueous polymer composition is prepared from the first hard polymer particles of Example 1.1 and the second soft polymer particles of Example 2.2 by first admixing 10.73 g of Example 1.1 with 24.19 g of Example 2.2 using a standard laboratory mixer to provide an aqueous blend composition. Next, 12.8 g of the titanium dioxide particle dispersion and 0.3 g of 28% ammonium hydroxide are added dropwise with mixing to the aqueous blend composition. The resulting aqueous polymer composition is stirred for 5 minutes. An aqueous solution containing 2.5 wt. % Natrosol™ 250HR thickener (Natrosol is a trademark of Hercules Corp.) is added to the aqueous polymer composition to adjust the viscosity to 90 KU. Water is added to adjust the solids level to 33% by volume. The solid material includes $TiO_2$, the first hard polymer particles of Example 1.1, and second soft polymer particles of Example 2.2. The % volume of solids is based on the total volume of the solid material in the aqueous polymer composition. The resulting aqueous polymer composition, Example 3.1, contains composite particles formed from the titanium dioxide particles and the first hard polymer particles, and has a PVC of 14.8.

EXAMPLE 3.2

Preparation of Aqueous Polymer Composition Containing First Hard Polymer Particles and Second Soft Polymer Particles The aqueous polymer composition of Example 3.2 is prepared from the first hard polymer particles of Example 1.1 and the second soft polymer particles of Example 2.3. Example 3.2 is prepared according to the general procedure for Example 3.1 except that the aqueous blend composition is prepared by admixing 10.73 g of Example 1.1 and 22.97 g of Example 2.3. The aqueous polymer composition, Example 3.2, contains composite particles formed from the titanium dioxide particles and the first hard polymer particles, has a solids level of 33% by volume, and has a PVC of 14.8.

EXAMPLE 3.3

Preparation of Aqueous Polymer Composition Containing First Hard Polymer Particles and Second Soft Polymer Particles The aqueous polymer composition of Example 3.3 is prepared from the first hard polymer particles of Example 1.1 and the second soft polymer particles of Example 2.4. Example 3.3 is prepared according to the general procedure for Example 3.1 except that the aqueous blend composition is prepared by admixing 10.73 g of Example 1.1 and 11.3 g of Example 2.4. The aqueous polymer composition, Example 3.3, contains composite particles formed from the titanium dioxide particles and the first hard polymer particles, has a solids level of 33% by volume, and has a PVC of 14.8.

EXAMPLE 3.4

Preparation of Aqueous Polymer Composition Containing First Hard Polymer Particles, First Soft Polymer Particles, and Second Soft Polymer Particles The aqueous polymer composition of Example 3.4 is prepared from the first hard polymer particles of Example 1.1, the first soft polymer particles of Example 1.2, and the second soft polymer particles of Example 2.3. Example 3.4 is prepared according to the general procedure for Example 3.1 except that the aqueous blend composition is prepared by admixing 5.36 g of Example 1.1, 5.53 g of Example 1.2, and 22.97 g of Example 2.3. The aqueous polymer composition, Example 3.4, contains composite particles formed from the titanium dioxide particles, the first hard polymer particles, and the first soft polymer particles. Example 3.4 has a solids level of 33% by volume, and has a PVC of 14.8.

EXAMPLE 3.5

Preparation of Aqueous Polymer Composition Containing First Hard Polymer Particles, First Soft Polymer Particles, and Second Soft Polymer Particles The aqueous polymer composition of Example 3.5 is prepared from the first hard polymer particles of Example 1.1, the first soft polymer particles of Example 1.3, and the second soft polymer particles of Example 2.3. Example 3.5 is prepared according to the general procedure for Example 3.1 except that the aqueous blend composition is prepared by admixing 5.36 g of Example 1.1, 5.68 g of Example 1.3, and 22.97 g of Example 2.3. The aqueous polymer composition, Example 3.5, contains composite particles formed from the titanium dioxide particles, the first hard polymer particles, and the first soft polymer particles. Example 3.5 has a solids level of 33% by volume, and has a PVC of 14.8.

EXAMPLE 3.6

Preparation of Aqueous Polymer Composition Containing First Hard Polymer Particles, First Hard-Soft Polymer Particles, and Second Soft Polymer Particles The aqueous polymer composition of Example 3.6 is prepared from the first hard polymer particles of Example 1.1, the first hard-soft polymer particles of Example 1.4, and second soft polymer particles of Example 2.3. Example 3.6 is prepared according to the general procedure for Example 3.1 except that the aqueous blend composition is prepared by admixing 5.36 g of Example 1.1, 6.61 g of Example 1.4, and 22.97 g of Example 2.3. The aqueous polymer composition, Example 3.6, contains composite particles formed from the titanium dioxide particles, the first hard polymer particles, and the first hard-soft polymer particles. Example 3.6 has a solids level of 33% by volume, and has a PVC of 14.8.

EXAMPLE 3.7

Preparation of Aqueous Polymer Composition Containing First Hard Polymer Particles, First Hard-Soft Polymer Particles, and Second Soft Polymer Particles The aqueous polymer composition of Example 3.7 is prepared from the first hard polymer particles of Example 1.1, the first hard-soft polymer particles of Example 1.5, and the second soft polymer particles of Example 2.3. Example 3.7 is prepared according to the general procedure for Example 3.1 except that the aqueous blend composition is prepared by admixing 5.36 g of Example 1.1, 6.58 g of Example 1.5, and 22.97 g of Example 2.3. The aqueous polymer composition, Example 3.7, contains composite particles formed from the titanium dioxide particles, the first hard polymer particles, and the first hard-soft polymer particles. Example 3.7 has a solids level of 33% by volume, and has a PVC of 14.8.

EXAMPLE 3.8

Preparation of Aqueous Polymer Composition Containing First Hard Polymer Particles, First Soft Polymer Particles, First Hard-Soft Polymer Particles, and Second Soft Polymer Particles The aqueous polymer composition of Example 3.8 is prepared from the first hard polymer particles of Example 1.1, the first soft polymer particles of Example 1.2, the first hard-soft polymer particles of Example 1.4, and the second soft polymer particles of Example 2.3. Example 3.8 is prepared according to the general procedure for Example 3.1 except that the aqueous blend composition is prepared by admixing 5.36 g of Example 1.1, 2.76 g of Example 1.2, 3.31 g of Example 1.4, and 22.97 g of Example 2.3. The aqueous polymer composition, Example 3.8, contains composite particles formed from the titanium dioxide particles, the first hard polymer particles, first soft polymer particles, and the first hard-soft polymer particles. Example 3.8 has a solids level of 33% by volume, and has a PVC of 14.8.

EXAMPLE 3.9

Preparation of Aqueous Polymer Composition Containing First Hard Polymer Particles and Second Soft Polymer Particles The aqueous polymer composition of Example 3.9 is prepared from the first hard polymer particles of Example 1.6 and the second soft polymer particles of Example 2.3. Example 3.9 is prepared according to the general procedure for Example 3.1 except that the aqueous blend composition is prepared by admixing 13.89 g of Example 1.6 and 22.97 g of Example 2.3. The aqueous polymer composition, Example 3.9, contains composite particles formed from the titanium dioxide particles and the first hard polymer particles. Example 3.9 has a solids level of 33% by volume, and has a PVC of 14.8.

EXAMPLE 3.10

Preparation of Aqueous Polymer Composition Containing First Hard Polymer and Second Soft Polymer Particles The aqueous polymer composition of Example 3.10 is prepared from the first hard polymer particles of Example 1.1 and the second soft polymer particles of Rovace™ 9900 latex (Rohm and Haas Co.) Rovace™ 9900 latex is an aqueous vinyl acetate/butyl acrylate copolymer dispersion containing second soft polymer particles having a $T_g$ of −5.6° C., is supplied at 55 wt. % solids, and does not contain phosphorus acid groups, phosphorus acid full-ester groups, or polyacid sidechain groups. Example 3.10 is prepared according to the general procedure for Example 3.1 except that the aqueous blend composition is prepared by admixing 10.73 g of Example 1.1 and 20.53 g of Rovace™ 9900 latex. The aqueous polymer composition, Example 3.10, contains composite particles formed from the titanium dioxide particles and the first hard polymer particles. Example 3.10 has a solids level of 33% by volume, and has a PVC of 14.8.

EXAMPLE 3.11

Preparation of Aqueous Polymer Composition Containing First Hard Polymer Particles and Second Soft Polymer Particles The aqueous polymer composition of Example 3.11 is prepared from the first hard polymer particles of Example 1.1 and second soft polymer particles of Airflex™ 809 latex (Air Products Co.). Airflex™ 809 latex is an aqueous ethylene-vinyl acetate copolymer dispersion containing second soft polymer particles having a $T_g$ of −5.6° C., is supplied at 55 wt. % solids, and does not contain phosphorus acid groups, phosphorus acid full-ester groups, or polyacid sidechain groups. Example 3.11 is prepared according to the general procedure for Example 3.1 except that the aqueous blend composition is prepared by admixing 10.73 g of Example 1.1 and 20.53 g of Airflex™ 809 latex. The aqueous polymer composition, Example 3.11, contains composite particles formed from the titanium dioxide particles and the first hard polymer particles. Example 3.11 has a solids level of 33% by volume, and has a PVC of 14.8.

Comparative A

Preparation of Comparative Aqueous Polymer Composition Containing Second Hard Polymer Particles and Second Soft Polymer Particles The comparative aqueous polymer composition of Comparative A is prepared from the second hard polymer particles of Example 2.1 and second soft polymer particles of Example 2.2. Comparative A is prepared according to the general procedure for Example 3.1 except that the aqueous blend composition is prepared by admixing 10.89 g of Example 2.1 and 24.19 g of Example 2.2. The comparative aqueous polymer composition, Comparative A, does not contain composite particles formed from the titanium dioxide particles and the second hard polymer particles, or the second soft polymer particles. Comparative A has a solids level of 33% by volume, and has a PVC of 14.8.

Comparative B

Preparation of Comparative Aqueous Polymer Composition Containing Second Hard Polymer Particles and Second Soft Polymer Particles The comparative aqueous polymer composition of Comparative B is prepared from the second hard polymer particles of Example 2.1 and second soft polymer particles of Rovace™ 9900 latex. Comparative B is prepared according to the general procedure for Example 3.1 except that the aqueous blend composition is prepared by admixing 10.73 g of Example 2.1 and 20.53 g of Rovace™ 9900 latex. The comparative aqueous polymer composition, Comparative B, does not contain composite particles formed from the titanium dioxide particles and the second hard polymer particles, or the second soft polymer particles. Comparative B has a solids level of 33% by volume, and has a PVC of 14.8.

Comparative C

Preparation of Comparative Aqueous Polymer Composition Containing Second Hard Polymer Particles and Second Soft Polymer Particles The comparative aqueous polymer composition of Comparative C is prepared from the second hard polymer particles of Example 2.1 and the second soft polymer particles of Airflex™ 809 latex. Comparative C is prepared according to the general procedure for Example 3.1 except that the comparative aqueous blend composition is prepared by admixing 10.73 g of Example 2.1 and 20.53 g of Airflex™ 809 latex. The comparative aqueous polymer composition, Comparative C, does not contain composite particles formed from the titanium dioxide particles and the second hard polymer particles, or the second soft polymer particles. Comparative C has a solids level of 33% by volume, and has a PVC of 14.8.

Comparative D

Preparation of Comparative Aqueous Polymer Composition Containing First Soft Polymer Particles and Second Soft Polymer Particles The comparative aqueous polymer composition of Comparative D is prepared from the first soft polymer particles of Example 1.3 and the second soft polymer particles of Example 2.3. Comparative D is prepared according to the general procedure for Example 3.1 except that the comparative aqueous blend composition is prepared by admixing 11.36 g of Example 1.3 and 22.97 g of Example 2.3. The comparative aqueous polymer composition, Comparative C, contains composite particles formed from the titanium dioxide particles and the first soft polymer particles, but does not contain hard polymer. Comparative D has a solids level of 33% by volume, and has a PVC of 14.8.

Comparative E

Preparation of Comparative Aqueous Polymer Composition Containing First Hard Polymer Particles and Comparative Polymer Particles The comparative aqueous polymer composition of Comparative E is prepared from the first hard polymer particles of Example 1.1 and comparative polymer particles. The comparative polymer particles are provided by Rhoplex® AC-261 dispersion (supplied by Rohm and Haas Company, Philadelphia Pa.), which contained comparative polymer particles having a $T_g$ of 11° C. Comparative E is prepared according to the general procedure for Example 3.1 except that the comparative aqueous blend composition is prepared by admixing 10.73 g of Example 1a with 22.96 g of Rhoplex® AC-261 dispersion. The comparative aqueous polymer composition, Comparative E, contains composite particles formed from the titanium dioxide particles and the first hard polymer particles, but does not contain soft polymer. Comparative E has a solids level of 33% by volume, and has a PVC of 14.8.

TABLE 3.1

Level of First Hard Polymer Particles, Total Soft Polymer, and Total Hard Polymer in the Aqueous Polymer Compositions of Examples 3.1 to 3.11 and Comparatives A to E

| Example | First Hard Polymer Particles (wt. %)* | Total Soft Polymer (wt. %)** | Total Hard Polymer (wt. %)** |
| --- | --- | --- | --- |
| 3.1 | 100 | 69.3 | 30.7 |
| 3.2 | 100 | 82.4 | 17.6 |
| 3.3 | 100 | 69.3 | 30.7 |
| 3.4 | 50 | 84.7 | 15.3 |
| 3.5 | 49.2 | 84.7 | 15.3 |
| 3.6 | 50 | 83.1 | 16.9 |
| 3.7 | 50 | 83.1 | 16.9 |
| 3.8 | 50 | 83.9 | 16.1 |
| 3.9 | 100 | 69.3 | 30.7 |
| 3.10 | 100 | 69.3 | 30.7 |
| 3.11 | 100 | 69.3 | 30.7 |
| Comparative A | 0 | 30.7 | 30.7 |
| Comparative B | 0 | 69.6 | 30.4 |
| Comparative C | 0 | 69.6 | 30.4 |
| Comparative D | 0 | 100 | 0 |
| Comparative E | 100 | 0 | 100*** |

*based on weight of first polymer particles.
**based on weight of total soft polymer and total hard polymer.
***Comparative E does not contain soft polymer. The total amount of hard polymer is 30.7 weight %, based on the total weight of the hard polymer and the comparative polymer.

EXAMPLE 4

Determination of Scattering Coefficients, Dirt Pickup Resistance, and Low Temperature Film Formation of Dried Coatings Prepared from Examples 3.1-3.11 and Comparatives A to E Low Temperature Film Formation (LTFF): The aqueous composition, a pine board, and the required test materials are placed in a controlled temperature/controlled humidity room having a temperature of 4.4° C. and 70% relative humidity at least 1 hour prior to testing, to allow materials to equilibrate to test conditions. The aqueous composition is applied by brush onto a white pine board in the room as stripes perpendicular to the length of the board. The spread rate of the aqueous composition is 110 cm²/ml, which is achieved by weighing the coated sample. The strips have dimensions of at least 5 cm by 12.7 cm. The applied aqueous composition is allowed to dry at the test conditions for at least a 24 hours. After drying, the coated pined board is removed from the constant temperature/constant humidity room and evaluated for cracking. The degree of cracking is determined by visually observing the samples using a 10× magnifying glass. The presence of cracks in the dried film indicates a fail rating, whereas a crack free film is given a pass rating.

Dirt Pickup Resistance (DPUR): The aqueous composition of this invention and a comparative aqueous composition (Comparative D), which does not contain hard polymer, are drawn down on separate aluminum panels at a wet thickness of 0.0762 mm (3 mil) using a Bird film applicator, 76.2 mm (3 inch) in width. The samples are allowed to dry at 21° C. and 50% relative humidity for 7 days. The samples are exposed in southern Florida at a commercial exposure station (Q-LAB Weathering Research Service, Homestead, Fla.). The exposure direction is south at a 45° angle. The colors of the dry coating samples are characterized by measuring initial values of L*, a*, and b* prior to exposure. After 90 days of exposure, the L*, a*, and b* values are remeasured to determine the changes in color of the dry coating samples. The changes in the values of L*, referred to as "ΔL*", are determined for the dry coating samples. A negative value for ΔL* indicates a darkening of the dry coating as a result of the pickup of dirt and other material on the dry coating surface.

The relative dirt pickup resistance is determined by comparing the coatings of this invention to the comparative coatings composition. The relative dirt pickup resistance is the ratio of the ΔL* value for the dry coating prepared from the comparative coating composition divided by the ΔL* value for the dry coating prepared from the aqueous polymer blend composition. A relative dirt pickup resistance value, referred to as "RL", having a value of 1.1 or greater indicates improvement in the dirt pickup resistance and is considered a pass rating whereas a value less than 1.1 is considered a fail rating.

Scattering Coefficients: The scattering coefficients of the dried coatings are determined using ASTM test method D 2805-96A. The coatings are allowed to dry for 7 days at 21° C. and 50% relative humidity. The Y-reflectance values of the dried coatings are measured using a Pacific Scientific Colorguard colorimeter (Gardner Ineotec). Three measurements are made for each dried coating and an average value is calculated. Using the procedures of ASTM 2805-96A, the scattering coefficient per micron thickness of the dried coating film (S/micron) is determined.

The relative scattering value, $R_s$, is determined by dividing the measured scattering coefficient for the dried coating by the measured scattering coefficient for a comparative dried coating. The relative scattering value is reported in units of relative scattering per micron (S/micron). The dried coating of Comparative A is the comparative dried coating for the dried coatings of Examples 3.1 through 3.9 and Comparative A. The dried coating of Comparative B is the comparative dried coating for the dried coatings of Example 3.10 and Comparative B. The dried coating of Comparative C is the comparative dried coating for dried coatings of Example 3.11 and Comparative C. Improved hiding is indicated by a value for $R_s$ of greater than one. The results are given in Table 4.1.

TABLE 4.1

Relative Scattering Value ($R_s$), Low Temperature Film Formation (LTFF), and Dirt Pickup Resistance (DPUR) for Dried Coatings Prepared from Examples 3.1–3.11 and Comparatives A to E

| Example | $R_s$ (S/micron) | LTFF | DPUR |
|---|---|---|---|
| 3.1 | >1 | P | P |
| 3.2 | >1 | P | P |
| 3.3 | >1 | P | P |
| 3.4 | >1 | P | P |
| 3.5 | >1 | P | P |
| 3.6 | >1 | P | P |
| 3.7 | >1 | P | P |
| 3.8 | >1 | P | P |
| 3.9 | >1 | P | P |
| 3.10 | >1 | P | P |
| 3.11 | >1 | P | P |
| Comparative A | 1 | P | P |
| Comparative B | 1 | P | P |
| Comparative C | 1 | P | P |
| Comparative D | >1 | P | F |
| Comparative E | >1 | F | P |

The results in Table 4.1 show that dried coatings prepared from the coating compositions of Example 3.1 to 3.11 have improved hiding over their respective comparative dried coatings. Further, these dried coatings also had acceptable low temperature film formation as well as acceptable dirt pickup resistance. In contrast, the comparative coatings did not provide a combination of improved hiding, acceptable low temperature film formation, and acceptable dirt pickup resistance. These results indicates that the coating compositions of this invention, which contain select combinations of first polymer particles and second polymer polymers, and select amounts of hard polymer and soft polymer, provided dried coatings with a combination of improved hiding, acceptable dirt pickup resistance, and acceptable low temperature film formation.

What is claimed is:

1. An aqueous polymer composition comprising:
   a) first polymer particles comprising at least one pendant group selected from the group consisting of phosphorus acid groups, phosphorus acid full-ester groups, polyacid sidechain groups, and mixtures thereof;
   wherein said first polymer particles comprise, based on weight of said first polymer particles:
      i) from 40 to 100 weight % first hard polymer particles having a glass transition temperature of at least 20° C.,
      ii) from 0 to 60 weight % first soft polymer particles having a glass transition temperature in the range of from −20° C. to 5° C.; and
      iii) from 0 to 60 weight % first hard-soft polymer particles comprising first soft polymer phase having a glass transition temperature in the range of from −20° C. to 5° C., and first hard polymer phase having a glass transition temperature of at least 20° C.;
   b) optionally, second polymer particles comprising:
      i) second soft polymer particles having a glass transition temperature in the range of from −20° C. to 5° C.,
      ii) second hard polymer particles having a glass transition temperature of at least 20° C.; or
      iii) second hard-soft polymer particles comprising second soft polymer phase having a glass transition temperature in the range of from −20° C. to 5° C., and second hard polymer phase having a glass transition temperature of at least 20° C.; and c) composite particles, wherein each of said composite particles comprises a pigment particle and a plurality of said first polymer particles attached to said pigment particle;

wherein said aqueous polymer composition comprises, based on total weight of said first polymer particles and said second polymer particles:

a total weight % of said first soft polymer particles, said first soft polymer phase, said second soft polymer particles, and said second soft polymer phase in the range of from 60 to 98 weight %, and a total weight % of said first hard polymer particles, said first hard polymer phase, said second hard polymer particles, and said second hard polymer phase in the range of from 2 to 40 weight %.

2. The aqueous polymer composition according to claim 1 comprising a volatile organic compound level of less than 5 weight %, based on weight of said aqueous polymer composition.

3. The aqueous polymer composition according to claim 1 wherein at least one soft polymer component selected from the group consisting of said first soft polymer particles, said first soft polymer phase, said second soft polymer particles, said second soft polymer phase, or combinations thereof, is prepared by:

a) an aqueous polymerization process in which at least 40 weight % of said at least one soft polymer component, based on total weight of said at least one soft polymer component, is formed by redox polymerization;

b) an aqueous polymerization process in the presence of 0.01 to 1 weight %, based on the weight of said at least one soft polymer component, of an organic compound selected from the group consisting of t-alkyl hydroperoxides, t-alkyl peroxides, t-alkyl peresters, and mixtures thereof, wherein said t-alkyl group has at least five carbon atoms;

c) an aqueous redox polymerization process that is effected in the presence of 0.001 to 0.05 moles chain transfer agent per kilogram weight of said at least one soft polymer component; or d) an aqueous polymer process in which at least 40 weight % of said at least one soft polymer component is polymerized from ethylenically unsaturated monomers in the presence of at least 5 weight % of added monomer that remains unreacted, based on the accumulated weight of said added monomer.

4. An aqueous polymer composition comprising:

a) first polymer particles comprising reacted complementary functional groups;

wherein said first polymer particles comprise, based on weight of said first polymer particles:

i) from 40 to 100 weight % first hard polymer particles having a glass transition temperature of at least 20° C., ii) from 0 to 60 weight % first soft polymer particles having a glass transition temperature in the range of from −20° C. to 5° C.; and iii) from 0 to 60 weight % first hard-soft polymer particles comprising first soft polymer phase having a glass transition temperature in the range of from −20° C. to 5° C., and first hard polymer phase having a glass transition temperature of at least 20° C.;

b) optionally, second polymer particles comprising:

i) second soft polymer particles having a glass transition temperature in the range of from −20° C. to 5° C., ii) second hard polymer particles having a glass transition temperature of at least 20° C.; or iii) second hard-soft polymer particles comprising second soft polymer phase having a glass transition temperature in the range of from −20° C. to 5° C., and second hard polymer phase having a glass transition temperature of at least 20° C.; and c) composite particles, wherein each of said composite particles comprises:

i) a pigment particle, ii) reacted coupling agents forming first covalent bonds to said pigment particle, and iii) a plurality of first polymer particles in which said reacted complementary functional groups form second covalent bonds with said reacted coupling agents;

wherein said aqueous polymer composition comprises, based on total weight of said first polymer particles and said second polymer particles:

a total weight % of said first soft polymer particles, first soft polymer phase, said second soft polymer particles, and said second soft polymer phase in the range of from 60 to 98 weight %, and a total weight % of said first hard polymer particles, said first hard polymer phase, said second hard polymer particles, and said second hard polymer phase in the range of from 2 to 40 weight %.

5. The aqueous polymer composition according to claim 4 comprising a volatile organic compound level of less than 5 weight %, based on weight of said aqueous polymer composition.

6. The aqueous polymer composition according to claim 4 wherein at least one soft polymer component selected from the group consisting of said first soft polymer particles, said first soft polymer phase, said second soft polymer particles, said second soft polymer phase, or combinations thereof, is prepared by:

a) an aqueous polymerization process in which at least 40 weight % of said at least one soft polymer component, based on total weight of said at least one soft polymer component, is formed by redox polymerization;

b) an aqueous polymerization process in the presence of 0.01 to 1 weight %, based on the weight of said at least one soft polymer component, of an organic compound selected from the group consisting of t-alkyl hydroperoxides, t-alkyl peroxides, t-alkyl peresters, and mixtures thereof, wherein said t-alkyl group has at least five carbon atoms;

c) an aqueous redox polymerization process that is effected in the presence of 0.001 to 0.05 moles chain transfer agent per kilogram weight of said at least one soft polymer component; or d) an aqueous polymer process in which at least 40 weight % of said at least one soft polymer component is polymerized from ethylenically unsaturated monomers in the presence of at least 5 weight % of added monomer that remains unreacted, based on the accumulated weight of said added monomer.

* * * * *